United States Patent
Hall et al.

(10) Patent No.: US 10,075,893 B2
(45) Date of Patent: *Sep. 11, 2018

(54) MEDIA DISTRIBUTION VIA A SCALABLE AD HOC GEOGRAPHIC PROTOCOL

(71) Applicant: AT&T Intellectual Property I L.P., Atlanta, GA (US)

(72) Inventors: Robert J. Hall, Berkeley Heights, NJ (US); Richard Robert Jamison, Santa Maria, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 59 days.

This patent is subject to a terminal disclaimer.

(21) Appl. No.: 14/987,391

(22) Filed: Jan. 4, 2016

(65) Prior Publication Data

US 2016/0198387 A1  Jul. 7, 2016

Related U.S. Application Data

(63) Continuation of application No. 14/279,441, filed on May 16, 2014, now Pat. No. 9,264,863, which is a
(Continued)

(51) Int. Cl.
*H04W 40/02* (2009.01)
*H04L 12/18* (2006.01)
(Continued)

(52) U.S. Cl.
CPC ....... *H04W 40/023* (2013.01); *H04L 12/1845* (2013.01); *H04W 4/021* (2013.01);
(Continued)

(58) Field of Classification Search
CPC .. H04L 12/1845; H04L 12/189; H04W 12/06; H04W 40/023; H04W 40/20;
(Continued)

(56) References Cited

U.S. PATENT DOCUMENTS 3,833,221 A    9/1974  Van
5,483,667 A    1/1996  Faruque
(Continued)

FOREIGN PATENT DOCUMENTS

WO   WO 2002/054671 A2   7/2002
WO   WO 2007/016641      2/2007

OTHER PUBLICATIONS

"Boost Mobile Introduces First Location-based, GPS games in US" http://www.physorg.com/news5824.html (Aug. 16, 2005).
(Continued)

*Primary Examiner* — Robert J Lopata
(74) *Attorney, Agent, or Firm* — Baker & Hostetler LLP

(57) ABSTRACT

Media is distributed via a scalable ad hoc geographic routing/broadcast protocol. Media can be transmitted from a mobile device to a cluster of mobile devices that are geographically located in a particular region. Devices that are located between the source and the intended target can act as routers with the ability to forward data packets toward the intended destination. In essence, a geocast network cloud is established, allowing any device within the cloud to communicate with any other device in the cloud. Devices in the network can constantly change position and the transmission path through the network can be constantly changing. The geocast protocol adapts to the changing conditions.

17 Claims, 16 Drawing Sheets

Related U.S. Application Data continuation of application No. 13/327,472, filed on Dec. 15, 2011, now Pat. No. 8,744,419.

(51) Int. Cl.

| | | |
|---|---|---|
| *H04W 4/021* | (2018.01) | |
| *H04W 4/06* | (2009.01) | |
| *H04W 40/20* | (2009.01) | |
| *H04W 4/02* | (2018.01) | |
| *H04W 4/12* | (2009.01) | |
| *H04W 12/06* | (2009.01) | |
| *H04W 84/22* | (2009.01) | |
| *H04W 84/18* | (2009.01) | |

(52) U.S. Cl.
CPC ............ *H04W 4/023* (2013.01); *H04W 4/06* (2013.01); *H04W 40/20* (2013.01); *H04L 12/189* (2013.01); *H04W 4/12* (2013.01); *H04W 12/06* (2013.01); *H04W 84/18* (2013.01); *H04W 84/22* (2013.01)

(58) Field of Classification Search
CPC ....... H04W 4/021; H04W 4/023; H04W 4/06; H04W 4/12; H04W 84/18; H04W 84/22
USPC .......................................................... 370/338
See application file for complete search history.

(56) References Cited

U.S. PATENT DOCUMENTS

| | | | |
|---|---|---|---|
| 5,686,901 A | 11/1997 | Chen | |
| 5,930,716 A | 7/1999 | Sonetaka | |
| 6,006,328 A | 12/1999 | Drake | |
| 6,015,344 A | 1/2000 | Kelly et al. | |
| 6,069,885 A | 5/2000 | Fong et al. | |
| 6,119,976 A | 9/2000 | Rogers | |
| 6,195,751 B1 | 2/2001 | Caronni et al. | |
| 6,304,556 B1 | 10/2001 | Haas | |
| 6,360,107 B1 | 3/2002 | Lin et al. | |
| 6,428,470 B1 | 8/2002 | Thompson | |
| 6,516,199 B1 | 2/2003 | Soederkvist et al. | |
| 6,628,620 B1 | 9/2003 | Cain | |
| 6,781,971 B1 | 8/2004 | Davis et al. | |
| 6,807,165 B2 | 10/2004 | Belcea | |
| 6,816,460 B1 | 11/2004 | Ahmed et al. | |
| 6,842,482 B1* | 1/2005 | Hiramatsu | H04L 1/1887 |
| | | | 375/219 |
| 6,870,846 B2 | 3/2005 | Cain | |
| 6,873,613 B1 | 3/2005 | Dent | |
| 6,879,574 B2 | 4/2005 | Naghian et al. | |
| 6,909,706 B2 | 6/2005 | Wilmer et al. | |
| 6,937,602 B2 | 8/2005 | Whitehill et al. | |
| 6,940,832 B2 | 9/2005 | Saadawi et al. | |
| 6,954,435 B2 | 10/2005 | Billhartz et al. | |
| 6,958,986 B2 | 10/2005 | Cain | |
| 6,987,777 B1 | 1/2006 | Cain et al. | |
| 7,027,822 B1 | 4/2006 | Hwang et al. | |
| 7,152,110 B2 | 12/2006 | Pierce | |
| 7,179,166 B1 | 2/2007 | Abbott | |
| 7,197,326 B2 | 3/2007 | Acampora | |
| 7,295,521 B2 | 11/2007 | Choi et al. | |
| 7,307,978 B2 | 12/2007 | Carlson | |
| 7,435,179 B1 | 10/2008 | Ford | |
| 7,525,933 B1 | 4/2009 | Hall | |
| 7,540,028 B2 | 5/2009 | Ahmed et al. | |
| 7,613,467 B2 | 11/2009 | Fleischman | |
| 7,669,052 B2 | 2/2010 | Asano et al. | |
| 7,808,960 B1 | 10/2010 | Chan et al. | |
| 7,813,326 B1 | 10/2010 | Kelm et al. | |
| 7,864,168 B2 | 1/2011 | French | |
| 7,895,273 B1 | 2/2011 | Haldar | |
| 7,917,169 B1 | 3/2011 | Hall | |
| 7,969,914 B1 | 6/2011 | Gerbe | |
| 7,970,749 B2 | 6/2011 | Uhlir et al. | |
| 8,073,327 B2 | 12/2011 | Mayer | |
| 8,085,813 B2 | 12/2011 | Melick et al. | |
| 8,128,405 B2 | 3/2012 | Preston et al. | |
| 8,149,801 B2 | 4/2012 | Hall | |
| 8,149,846 B2 | 4/2012 | Mutnuru et al. | |
| 8,218,463 B2 | 7/2012 | Hall | |
| 8,248,367 B1 | 8/2012 | Barney et al. | |
| 8,289,186 B2* | 10/2012 | Osafune | G08G 1/20 |
| | | | 340/435 |
| 8,332,544 B1 | 12/2012 | Ralls et al. | |
| 8,341,271 B2 | 12/2012 | Cho et al. | |
| 8,355,410 B2 | 1/2013 | Hall | |
| 8,359,643 B2 | 1/2013 | Low et al. | |
| 8,376,857 B1 | 2/2013 | Shuman et al. | |
| 8,483,616 B1 | 7/2013 | Hall | |
| 8,483,652 B2 | 7/2013 | Hall | |
| 8,599,848 B2 | 12/2013 | Janneteau | |
| 8,702,506 B2 | 4/2014 | Hall | |
| 8,712,056 B2 | 4/2014 | Hall | |
| 8,744,419 B2 | 6/2014 | Hall | |
| 8,777,752 B2 | 7/2014 | Hall | |
| 8,924,997 B2* | 12/2014 | Chow | H04L 63/10 |
| | | | 725/25 |
| 8,965,670 B2* | 2/2015 | Peterson | G06F 17/30241 |
| | | | 455/457 |
| 9,036,509 B1 | 5/2015 | Addepalli et al. | |
| 9,161,158 B2 | 10/2015 | Hall | |
| 9,319,842 B2 | 4/2016 | Hall | |
| 9,652,461 B2* | 5/2017 | Link, II | G06F 17/30041 |
| 2001/0014094 A1 | 8/2001 | Epley | |
| 2002/0067730 A1* | 6/2002 | Hinderks | G06Q 30/02 |
| | | | 370/395.52 |
| 2002/0085582 A1 | 7/2002 | Kim | |
| 2002/0113872 A1 | 8/2002 | Kinjo | |
| 2002/0141454 A1 | 10/2002 | Muniere | |
| 2002/0155846 A1 | 10/2002 | Shiraga | |
| 2002/0163912 A1 | 11/2002 | Carlson | |
| 2002/0167960 A1 | 11/2002 | Garcia-Luna-Aceves | |
| 2002/0169971 A1 | 11/2002 | Asano et al. | |
| 2003/0074413 A1 | 4/2003 | Nielsen et al. | |
| 2003/0103521 A1 | 6/2003 | Raphaeli et al. | |
| 2003/0105956 A1 | 6/2003 | Ishiguro et al. | |
| 2003/0140149 A1 | 7/2003 | Marejka et al. | |
| 2003/0145095 A1 | 7/2003 | Liu et al. | |
| 2003/0153373 A1 | 8/2003 | Squibbs | |
| 2003/0174690 A1 | 9/2003 | Benveniste | |
| 2003/0187570 A1 | 10/2003 | Impson et al. | |
| 2003/0193394 A1 | 10/2003 | Lamb | |
| 2003/0235158 A1 | 12/2003 | Lee | |
| 2004/0013062 A1 | 1/2004 | Hino et al. | |
| 2004/0032847 A1 | 2/2004 | Cain | |
| 2004/0083385 A1 | 4/2004 | Ahmed et al. | |
| 2004/0100936 A1 | 5/2004 | Liu et al. | |
| 2004/0121792 A1 | 6/2004 | Allen et al. | |
| 2004/0151144 A1 | 8/2004 | Benveniste | |
| 2004/0185881 A1 | 9/2004 | Lee et al. | |
| 2004/0213270 A1 | 10/2004 | Su et al. | |
| 2004/0259563 A1 | 12/2004 | Morton et al. | |
| 2005/0036448 A1 | 2/2005 | Leeuwen | |
| 2005/0039040 A1 | 2/2005 | Ransom | |
| 2005/0058151 A1 | 3/2005 | Yeh | |
| 2005/0086350 A1 | 4/2005 | Mai | |
| 2005/0096065 A1 | 5/2005 | Fleischman | |
| 2005/0129051 A1 | 6/2005 | Zhu et al. | |
| 2005/0152318 A1 | 7/2005 | Elbatt et al. | |
| 2005/0152378 A1 | 7/2005 | Bango et al. | |
| 2005/0208949 A1 | 9/2005 | Chiueh | |
| 2005/0243788 A1 | 11/2005 | Janczak | |
| 2005/0254453 A1 | 11/2005 | Barneah | |
| 2005/0259597 A1 | 11/2005 | Benedetto | |
| 2005/0271057 A1 | 12/2005 | Kim et al. | |
| 2006/0013154 A1 | 1/2006 | Choi et al. | |
| 2006/0023677 A1 | 2/2006 | Labrador | |
| 2006/0084444 A1 | 4/2006 | Kossi et al. | |
| 2006/0126535 A1 | 6/2006 | Sherman | |
| 2006/0128349 A1 | 6/2006 | Yoon | |
| 2006/0148516 A1 | 7/2006 | Reddy et al. | |
| 2006/0153157 A1 | 7/2006 | Roh et al. | |
| 2006/0227787 A1 | 10/2006 | Furlong et al. | |

(56) References Cited

U.S. PATENT DOCUMENTS

| | | | |
|---|---|---|---|
| 2006/0236153 A1* | 10/2006 | Aaltonen | H04L 1/0057 714/25 |
| 2007/0008925 A1 | 1/2007 | Dravida et al. | |
| 2007/0019591 A1 | 1/2007 | Chou et al. | |
| 2007/0019594 A1 | 1/2007 | Perumal et al. | |
| 2007/0104096 A1 | 5/2007 | Ribera | |
| 2007/0110092 A1 | 5/2007 | Kangude et al. | |
| 2007/0124395 A1 | 5/2007 | Edge et al. | |
| 2007/0180533 A1 | 8/2007 | Ramaiah et al. | |
| 2007/0198731 A1 | 8/2007 | Li et al. | |
| 2007/0217346 A1 | 9/2007 | Zheng | |
| 2007/0226765 A1* | 9/2007 | Bahnck | H04H 20/103 725/63 |
| 2007/0259716 A1 | 11/2007 | Mattice et al. | |
| 2007/0259717 A1 | 11/2007 | Mattice et al. | |
| 2007/0263571 A1 | 11/2007 | Hermann et al. | |
| 2007/0265088 A1 | 11/2007 | Nakada et al. | |
| 2007/0265089 A1 | 11/2007 | Robarts | |
| 2007/0266396 A1 | 11/2007 | Estermann | |
| 2007/0283001 A1 | 12/2007 | Spiess et al. | |
| 2007/0287437 A1 | 12/2007 | Cartmell | |
| 2008/0015024 A1 | 1/2008 | Mullen | |
| 2008/0039113 A1 | 2/2008 | Liu et al. | |
| 2008/0076569 A1 | 3/2008 | Tabata | |
| 2008/0080401 A1 | 4/2008 | Ribiere | |
| 2008/0095134 A1 | 4/2008 | Chen et al. | |
| 2008/0095163 A1 | 4/2008 | Chen et al. | |
| 2008/0137624 A1 | 6/2008 | Silverstrim et al. | |
| 2008/0144493 A1 | 6/2008 | Yeh | |
| 2008/0147854 A1 | 6/2008 | Van Datta et al. | |
| 2008/0159236 A1 | 7/2008 | Ch'ng | |
| 2008/0163355 A1 | 7/2008 | Chu | |
| 2008/0186206 A1 | 8/2008 | Reumerman | |
| 2008/0192737 A1 | 8/2008 | Miyazaki | |
| 2008/0262928 A1 | 10/2008 | Michaelis | |
| 2008/0310439 A1 | 12/2008 | Gale et al. | |
| 2008/0317017 A1 | 12/2008 | Wiemann et al. | |
| 2009/0005140 A1 | 1/2009 | Rose et al. | |
| 2009/0030605 A1 | 1/2009 | Breed | |
| 2009/0017913 A1 | 2/2009 | Bell et al. | |
| 2009/0041039 A1 | 2/2009 | Bear | |
| 2009/0045977 A1 | 2/2009 | Bai et al. | |
| 2009/0046628 A1 | 2/2009 | Hall | |
| 2009/0073912 A1 | 3/2009 | Bauchot et al. | |
| 2009/0119696 A1* | 5/2009 | Chow | H04L 63/10 725/25 |
| 2009/0122753 A1 | 5/2009 | Hughes et al. | |
| 2009/0138353 A1 | 5/2009 | Mendelson | |
| 2009/0175223 A1 | 7/2009 | Hall | |
| 2009/0195401 A1 | 8/2009 | Maroney et al. | |
| 2009/0201860 A1 | 8/2009 | Sherman et al. | |
| 2009/0207783 A1 | 8/2009 | Choi et al. | |
| 2009/0245518 A1 | 10/2009 | Bai et al. | |
| 2009/0248420 A1 | 10/2009 | Basir | |
| 2009/0274093 A1 | 11/2009 | Senouci et al. | |
| 2009/0292926 A1 | 11/2009 | Daskalopoulos et al. | |
| 2009/0298461 A1 | 12/2009 | O'Reilly | |
| 2009/0310516 A1* | 12/2009 | Goel | H04L 12/1886 370/254 |
| 2009/0323579 A1 | 12/2009 | Bai et al. | |
| 2009/0325603 A1 | 12/2009 | Van Os et al. | |
| 2010/0008259 A1 | 1/2010 | Yoon et al. | |
| 2010/0029245 A1 | 2/2010 | Wood et al. | |
| 2010/0042601 A1 | 2/2010 | Kelley et al. | |
| 2010/0060480 A1 | 3/2010 | Bai et al. | |
| 2010/0064307 A1 | 3/2010 | Malhotra et al. | |
| 2010/0067451 A1 | 3/2010 | Hall | |
| 2010/0069109 A1 | 3/2010 | Hall | |
| 2010/0074234 A1 | 3/2010 | Banks et al. | |
| 2010/0082513 A1 | 4/2010 | Liu | |
| 2010/0115605 A1* | 5/2010 | Beattie | H04L 41/5019 726/15 |
| 2010/0125865 A1* | 5/2010 | Ospalik | H04H 20/10 725/25 |
| 2010/0125867 A1* | 5/2010 | Sofos | H04N 7/165 725/28 |
| 2010/0128653 A1 | 5/2010 | Tateson | |
| 2010/0150129 A1 | 6/2010 | Jin et al. | |
| 2010/0162149 A1 | 6/2010 | Sheleheda et al. | |
| 2010/0169009 A1 | 7/2010 | Breed et al. | |
| 2010/0202346 A1 | 8/2010 | Sitzes et al. | |
| 2010/0214987 A1 | 8/2010 | Mori | |
| 2010/0215040 A1 | 8/2010 | Kappler et al. | |
| 2010/0226342 A1 | 9/2010 | Coiling et al. | |
| 2010/0235633 A1 | 9/2010 | Asano et al. | |
| 2010/0245124 A1 | 9/2010 | Bai et al. | |
| 2010/0248618 A1 | 9/2010 | Bai et al. | |
| 2010/0248843 A1 | 9/2010 | Karsten | |
| 2010/0250106 A1 | 9/2010 | Bai et al. | |
| 2010/0250346 A1 | 9/2010 | Bai et al. | |
| 2010/0251282 A1* | 9/2010 | Howcroft | H04N 7/16 725/25 |
| 2010/0253547 A1 | 10/2010 | Tenetylo | |
| 2010/0279776 A1 | 11/2010 | Hall | |
| 2010/0287011 A1 | 11/2010 | Muchkaev | |
| 2010/0304759 A1 | 12/2010 | Leppanen | |
| 2010/0329463 A1 | 12/2010 | Ratliff et al. | |
| 2011/0002243 A1 | 1/2011 | Sherman et al. | |
| 2011/0016225 A1 | 1/2011 | Park et al. | |
| 2011/0058675 A1* | 3/2011 | Brueck | H04N 21/2541 380/277 |
| 2011/0063116 A1 | 3/2011 | Lepley et al. | |
| 2011/0081973 A1 | 4/2011 | Hall | |
| 2011/0102459 A1 | 5/2011 | Hall | |
| 2011/0103302 A1 | 5/2011 | Hall | |
| 2011/0105151 A1 | 5/2011 | Hall | |
| 2011/0109482 A1* | 5/2011 | Haran | H04L 12/1877 340/995.1 |
| 2011/0158295 A1* | 6/2011 | Shiizaki | H04B 7/155 375/211 |
| 2011/0164546 A1 | 7/2011 | Mishra et al. | |
| 2011/0177829 A1 | 7/2011 | Platt et al. | |
| 2011/0179330 A1* | 7/2011 | Matsumoto | H04L 1/1829 714/748 |
| 2011/0191425 A1 | 8/2011 | Brodeur | |
| 2011/0201369 A1 | 8/2011 | Kim et al. | |
| 2011/0230202 A1 | 9/2011 | Wood et al. | |
| 2011/0244887 A1 | 10/2011 | Dupray et al. | |
| 2011/0299685 A1 | 12/2011 | Hall | |
| 2012/0016940 A1 | 1/2012 | Hall | |
| 2012/0023550 A1 | 1/2012 | Gang | |
| 2012/0030292 A1* | 2/2012 | John | G06F 17/30023 709/206 |
| 2012/0039231 A1 | 2/2012 | Suri et al. | |
| 2012/0058744 A1* | 3/2012 | Felt | H04M 3/382 455/414.1 |
| 2012/0058814 A1 | 3/2012 | Lutnick et al. | |
| 2012/0072845 A1* | 3/2012 | John | G06F 17/30038 715/738 |
| 2012/0079080 A1 | 3/2012 | Pishevar | |
| 2012/0084364 A1 | 4/2012 | Sivavakeesar | |
| 2012/0090000 A1* | 4/2012 | Cohen | G11B 27/034 725/32 |
| 2012/0094770 A1 | 4/2012 | Hall | |
| 2012/0108326 A1 | 5/2012 | Hall | |
| 2012/0113986 A1* | 5/2012 | Shaffer | H04L 1/1854 370/390 |
| 2012/0128010 A1 | 5/2012 | Huang et al. | |
| 2012/0131611 A1* | 5/2012 | Yeap | H04N 21/42202 725/35 |
| 2012/0134317 A1* | 5/2012 | Weitkemper | H04L 1/0026 370/315 |
| 2012/0157210 A1 | 6/2012 | Hall | |
| 2012/0236718 A1 | 9/2012 | Noureddin et al. | |
| 2012/0251076 A1* | 10/2012 | Stewart | H04N 5/913 386/252 |
| 2012/0251077 A1* | 10/2012 | Stewart | H04N 5/913 386/253 |
| 2012/0329538 A1 | 12/2012 | Hall | |
| 2013/0012231 A1 | 1/2013 | Hall | |
| 2013/0090129 A1* | 4/2013 | Turner | H04W 64/00 455/456.1 |

(56) References Cited

U.S. PATENT DOCUMENTS

| | | |
|---|---|---|
| 2013/0099941 A1 | 4/2013 | Hall |
| 2013/0099976 A1 | 4/2013 | Cornwall |
| 2013/0188195 A1 | 7/2013 | Messerschimdt |
| 2013/0232558 A1* | 9/2013 | Brown .................. H04W 4/021 726/4 |
| 2013/0242956 A1 | 9/2013 | Hall |
| 2013/0244564 A1 | 9/2013 | Hall |
| 2014/0082369 A1 | 3/2014 | Waclawsky et al. |
| 2014/0098686 A1 | 4/2014 | Panta |
| 2014/0100027 A1 | 4/2014 | Harris et al. |
| 2014/0161006 A1 | 6/2014 | Hall |
| 2014/0247769 A1 | 9/2014 | Hall |
| 2014/0335952 A1 | 11/2014 | Hall |

OTHER PUBLICATIONS

"Sony_bigwig hints at GPS-enabled PSP games";http:www.vespacious.com/sony-bigwig-hints-at-gps-enabled-psp-games.html (Dec. 22, 2008).

Location-Enabled Mobile Gaming; http://www.nn4d.com/site/global/market/affiliatesites/lbsglobe/ibsapplications/mobilegaming.jsp (2007).

Aggarwal, Sudhir et al., "Accuracy in dead reckoning based distributed multi-player games", SIGCOMM '04 Workshops, (Proceedings of 3rd ACM SIGCOMM Workshop on Network and System Support for Games), Aug. 30-Sep. 3, 2004, Portland, Oregon, pp. 161-165.

Balasubramaniam, et al. "Interactive WiFi Connectivity for Moving Vehicles," Proceedings of SIGCOMM, Aug. 17-22, 2008, 12 pages.

Bjerver, Martin, "Player Behaviour in Pervasive Games—using the City as a Game Board in Botfighters", Master of Science Thesis, KTH Computer Science and Communication, Stockholm, Sweden, 2006.

Bzflag(6):tank battle game—linux man page, Google date Feb. 1, 2001, downloaded from http://linux.die.net/man/6/bzflag.

Corbett, et al. "A Partitioned Power and Location Aware MAC Protocol for Mobile Ad Hoc Networks," Technical Report No. 553, University of Sydney, School of Information Technologies, Jul. 2004, 7 pages.

Das, et al., "SPAWN: A Swarming Protocol for Vehicular Ad-Hoc Wireless Networks," Proceedings of 181 ACM Vanet, Oct. 2004, 2 pages.

de Souza e Silva, Adriana, "Alien revolt (2005-2007): A case study of the first location-based mobile game in Brazil", IEEE Technology and Society Magazine, Spring 2008, pp. 18-28.

Dialogic, "Adding location based services to existing architectures", Application Note: Location-Based Services, 9862-02, Oct. 2007, 14 pages, downloaded from http://www .dialogic.com/-/med is/prod u cts/docs/sig naling-and-ss 7-components/9862_Add_Locationbased_Servs_an.pdf.

Eriksson, et al., "Cabernet: Vehicular Content Delivery Using WiFi," Proceedings of Mobicom, Sep. 2008, 12 pages.

Gallagher, Sean, "Army prepares test of new wireless war game gear", Defense Systems, Jul. 7, 2008, downloaded from http://defensesystems.com/articles/2008/07/army-preparestest-of-new-wireless-war-game-gear.aspx.

German Aerospace Center, Simulation of Urban Mobility, 2010, http://sumo.sourceforgenet, 1 page.

Gupta, et al., "The Capacity of Wireless Networks," IEEE Transactions on Information Theory, 46(2), Mar. 2000, 17 pages.

Hadaller, et al., "Vehicular Opportunistic Communication Under The Microscope," Proceedings of MobiSys, Jun. 11-14, 2007, 206-219.

Halas, Jacek, "Ghost Recon: Advanced Warfighter Game Guide, [Mission 01] Contact!—Objective: Locate Ramirez with the Drone", 2007, downloaded from http://guides.gamepressure.com/ghostreconadvancedwarfighter/guide.asp?ID=986.

Hall "Combinatorial Communications Modeling of Real-Time Engagement Adjudication Architectures", IEEE Military Communications Conference, vol. 3, 1488-1494, Oct. 2005.

Hall, "An Improved Geocast for Mobile Ad Hoc Networking," IEEE Transactions on Mobile Computing, 2010, 1-14.

Hall, "Cheating Attacks and Resistance Techniques in Geogame Design," Proc. 2010 ACM FuturePiay Symposium, 2010, 82-89.

Hall, "RTEQ: Modeling and Validating Infinite-State Hard-Real-Time Systems", AT&T Labs Research, ASE 2007, Nov. 2007, 4 pages.

Hall, et al., "A Tiered Geocast Protocol for Long Range Mobile Ad Hoc Networking," Proceedings of the 2006 IEEE Military Communications Conf., 2006, 8 pages.

Hall et al. "An Improved Geocast for Mobile Ad Hoc Networks, IEEE Transactions on Mobile Computing", pp. 254-266, vol. 10, No. 2, Feb. 2011.

Hallet al., "A Two-Level Quality of Service Scheme for Collision based on Mobile Ad Hoc Networks", IEEE, 1-4244-1513-06/07, 2007, 8 pages.

Harris, RF-6920 C2CE-CNR Situational Awareness Application Brochure, Dowloaded from http://rf.harris.com/media/R_F-6920tcm26-9172.pdf, 2 pages, Nov. 2008.

Heissenbuttel, et al., "BLR: Beacon-Less Routing Algorithm for Mobile Ad-Hoc Networks," Elsevier's Computer Communications Journal, 27, 2003, 15 pages.

Hohfeld, Alexander, "In and out of reality: Janus-faced location awareness in ubiquitous games", Journal of Software, 2(6), Dec. 2007, 86-92.

http://askville.amazon.com/Wii-games-play-Internet-Family/AnswerViewer.do?requestId-6796582(2007).

Hull, et al., "CarTel: A Distributed Mobile Sensor Computing System," Proceedings of ACM SenSys, Nov. 2006, 14 pages.

Kaplan, et al., "The Analysis of a Generic Air-to-Air Missile Simulation Model", NASA Technical Memorandum 109057, 48 pages, Jun. 1994.

Karp, et al, "GPSR: Greedy Perimeter Stateless Routing for Wireless Networks," Proceedings of Mobicom, 2000, ACM 2000, 12 pages.

Kim, Seong-Whan et al., "Kalman filter based dead reckoning algorithm for minimizing network traffic between mobile nodes in wireless GRID", Embedded and Ubiquitous Computing, Lecture Notes in Computer Science, 4096, 2006, 162-170.

Ko et al., "Geocasting in Mobile Ad Hoc Networks: Location-based Multicast Algorithms", Technical Report TR-98-018 Texas A&M University, Sep. 1998.

Ko, et al., "Flooding-Based Geocasting Protocols for Mobile Ad Hoc Networks," Mobile Networks and Applications, Dec. 2002, 7, 471-480.

Kuhn, et al., "Geometric Ad-Hoc Routing: Of Theory and Practice," Proc. 2003 Symposium on Principles of Distributed Computing, ACM 2003, 10 pages.

Lee, et al., "CarT arrent: A Bit-Torrent System for Vehicular Ad-Hoc Networks," Mobile Networking for Vehicular Environments, Sep. 2007, 6 pages.

Lee, et al., "Efficient Geographic Routing in Multihop Wireless Networks," Proc. MobiHoc 2005, ACM, 2005, 12 pages.

Liao et al., "GRID: A Fully Location-Aware Routing Protocol for Mobile Ad Hoc Networks", Telecommunication Systems, 2001, 18, pp. 1-26.

Lindo, Wayne A. et al., "Network modeling and simulation in the OneTESS program", Fall Simulation Interoperability Workshop 2006, Orlando, Florida, USA, Sep. 10-15, 2006, 155ff.

Illyas, "Body Personal, and Local Ad Hoc Wireless Networks", Chapter 1, CRC Press, 2003, 22 pages.

Maihofer, "A Survey of Geocast Routing Protocols," IEEE Communications Surveys, Jun. 2004, 32-42.

Manvi, et al., "Performance Analysis of AODV, DSR, and Swarm Intelligence Routing Protocols in Vehicular Ad Hoc Network Environment," Proceedings of IEEE Future Computer and Communications, Apr. 2009, 21-25.

MyCheats web page, "Ghost Recon: Advanced Warfighter Superguide, Reach Ramirez", (Jul. 19, 2006), downloaded from http:/ /mycheats.1up.com/view/section/3139558/18404/ghost_recon_advanced_warfighter/pc.

(56) References Cited

OTHER PUBLICATIONS

Ni, et al., "The Broadcast Storm Problem in a Mobile Ad Hoc Network," Proceedings of the 5th Annual ACM/IEEE International Conference on Mobile Computing and Networking, ACM, 1999, 151-162.
Nicklas, D., and Mitschang, B., "On building location aware applications using an open platform based on the NEXUS Augmented World Model." Software and Systems Modeling, 2004, 3, 303-313.
Niculescu, et al., "Trajectory Based Forwarding and Its Applications," Proc. Mobicom 2003, ACM, 2003, 13 pages.
Nintendo, The computer game "Mario Kart DS", released in North America on Nov. 14, 2005, published by Nintendo, as evidenced by the game FAQ by Alex, downloaded from http://db.gamefaqs.com/portable/ds/file/mario_kart_ds_h.txt, with a game FAQ reported upload date of Jul. 15, 2007, p. 11.
Ns-2, "The Network Simulator," 2010, http://isi.edu/nsnam/ns.
Panta, "GeoV2V: Vehicular Communications Using a Scalable Ad Hoc Geocast Protocol," AT&T Labs Research, 14 pages.
Santos, Nuno et al., "Vector-field consistency for ad-hoc gaming", Middleware 2007, LNCS 4834,2007, pp. 80-100.
Schutzberg, "Phone-based GPS-based Games: Missing Pieces"; http://www.directionsmag.com/articlephp?article_id=939 (Aug. 17, 2005).
Schwingenschlogl, "Geocast Enhancements of AODV for Vehicular Networks," ACM SIGMOBILE Mobile Computing and Communications Review, Jun. 2002, 18 pages.
Seong-Whan, et al., "Kalma Filter Based Dead Reckoning Algorithm for Minimizing Network Traffic Between Mobile Nodes in Wireless GRID", Embedded and Ubiquitous Computing, Lecture Notes in Computer Science, 4096, Aug. 2006, 162-170.
Shevade, et al., "Enabling High-Bandwidth Vehicular Content Distribution," Proceedings of CoNEXT 2010, Nov. 30-Dec. 3, 2010, 12 pages.
Shih et al., A Distributed Slots Reservation Protocol for QoS Routing on TDMA-based Mobile Ad Hoc Networks, 2004, (ICON 2004), Proceedings, 1ih IEEE International Conference, Nov. 2004, 2, 660-664.
Shih et al., "CAPC: A Collision Avoidance Power Control MAC Protocol for Wireless Ad Hoc Networks", IEEE Communications Letters, Sep. 2005, 9(9), 859-861.
Social + Gaming SWik: http://swik.net/social+gaming.
Sotamaa, Olli, "All the world's a Botfighter Stage: Notes on location-based multi-user gaming", Proceedings of Computer Games and Digital Cultures Conference, Tampere University Press, 2002, pp. 35-44.
STEVE:"GPS-enabled Cell Phone Games" http://www.strangenewproducts.com/2005/08/gps-enabled-cell-phone-games.html , Aug. 15, 2005.
Trivette, Sensor Integration for the One Tactial Engagement Simulation System (One Tess), Downloaded from http://vault.swri.org/cms/papers/3793presentation_2005SensorsGovOneTess.pdf, 28 pages, 2005.
Tseng et al., "Fully Power-Aware and Location-Aware Protocols for Wireless Multi-hop Ad Hoc Networks", Proc. of IEEE Inti. Conference on Computer Communications and Networks (ICCCn), 2002, 6 pages.
Various Authors, The Wikipedia page for the "snake" computer games, Nov. 3, 2008 version, Wikipedia.com, downloaded by the USPTO from http://en.wikipedia.org/w/index.php?title=Snake_(video_game)&oldid=249370716 on Oct. 4, 2012.
Winkler, Additional date evidence for the Ars Electronica organization archive document http:/ /archive.aec.at/su bmission/2004/U 19/1 043/, retrieved from http://web.archive.org/web/20050508084628/http://www.aec.aUen/archives/prix_archive/prix_project.asp?iProjectI D= 12899.
Winkler, The computer game "GPS::Tron", as evidenced by the Ars Electronica organization archive document http://archive.aec.at/submission/2004/U 19/1043/, where the document has an earliest archive.org verified publication date May 4, 2005, pp. 1-2.
Yassein, et al., "Performance Analysis of Adjusted Probabilistic Broadcasting in Mobile Ad Hoc Networks," Proc. 11 1 h Inti. Conf. on Parallel and Distributed Systems Workshops, 2005, 27 pages.
Zahn, et al., "Feasibility of Content Dissemination Between Devices in Moving Vehicles," Proceedings of CoNEXT 2009, Dec. 1-4, 2009, 11 pages.
Zorzi, et al., "Geographic Random Forwarding (GeRaF) for Ad Hoc and Sensor Networks: Multihop Peformance," IEEE Transactions on Mobile Computing, Dec. 2003, 11 pages.

\* cited by examiner

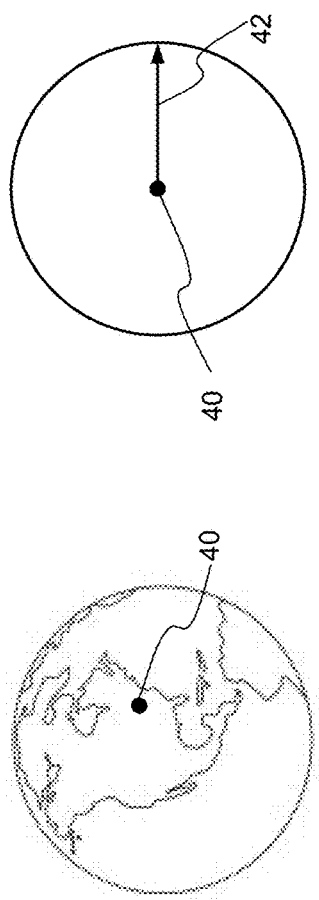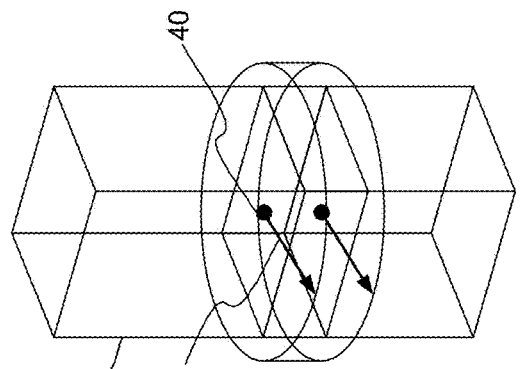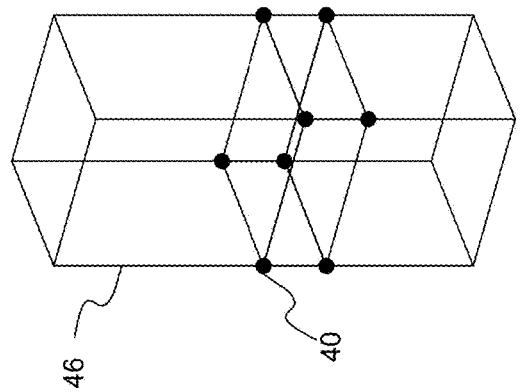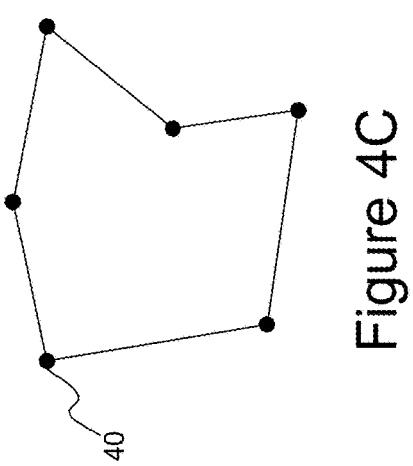
Figure 4A
Figure 4B
Figure 4C
Figure 4D
Figure 4E
FIGURE 4

MEDIA DISTRIBUTION VIA A SCALABLE AD HOC GEOGRAPHIC PROTOCOL

CROSS REFERENCE TO RELATED APPLICATIONS

The instant application is a continuation of, and claims priority to, U.S. patent application Ser. No. 14/279,441, filed May 16, 2014, which is a continuation of U.S. patent application Ser. No. 13/327,472, filed Dec. 15, 2011, now U.S. Pat. No. 8,744,419 issued on Jun. 3, 2014. U.S. patent application Ser. No. 14/279,441 and U.S. Pat. No. 8,744,419 are incorporated herein by reference in their entireties.

TECHNICAL FIELD

The technical field generally relates to communications and more particularly to distribution of media via an ad hoc geographic routing/broadcast (geocast) protocol.

BACKGROUND

Scenarios can be envisioned in which it would be advantageous to be able send the same media, such as audio and/or voice communication, for example, to everyone in a geographic area. Such scenarios include, for example, gaming, emergency response, and military applications. Previous attempts to distribute voice include radio-based walkie-talkies, conference call technology, and old-style "party lines" on wired networks. Broadcast-based walkie-talkie-like shared-radio channels distribute information to all devices in the coverage/range of transmitters but do not provide relaying to other devices. Conference call technology requires a central server that mixes signals, however it cannot be guaranteed that a central server will be in contact with every client device. Wired party lines are applicable wired telephone systems, and thus are not applicable to wireless systems.

SUMMARY

The following presents a simplified summary that describes some aspects or embodiments of the subject disclosure. This summary is not an extensive overview of the disclosure. Indeed, additional or alternative embodiments of the subject disclosure may be available beyond those described in the summary.

Media may be distributed via an ad hoc geographic routing/broadcast (geocast) protocol. The media may include any appropriate media, such as, for example, a media stream, audio data, voice-based information, image data, graphics data, video data, multimedia data, etc. Media can be in any appropriate format, such as, for example, prerecorded, live, synchronous voice conversations, or the like. The media can be provided to all devices, or a specific device(s), in a specified geographic region in an efficient and scalable manner. The distribution of media via an ad hoc geocast protocol as described herein is applicable to regions regardless as to whether a region is lightly or heavily populated. The region of interest need not align with existing coverage areas of voice and data mobile radio systems.

In example embodiments, media may be transmitted, via a WiFi (or the like) adhoc network, from one device to a cluster of devices that is geographically located in a particular region. Devices that are located between the source and the intended recipient may act as routers with the ability to forward data packets toward the intended recipient. In effect, the devices form a geocast network cloud allowing any device within the cloud to communicate with any other device in the cloud. Devices form a network of nodes wherein the nodes of the network can constantly change position. Thus, the transmission path through the network can be constantly changing. The geocast protocol adapts to the changing conditions. The herein described distribution of voice via a geocast protocol is applicable to a large variety of devices comprising GPS and WiFi capabilities.

BRIEF DESCRIPTION OF THE DRAWINGS

Reference will now be made to the accompanying drawings, which are not necessarily drawn to scale.

FIGS. 4A-4E depict exemplary geocast regions or boundaries which can be utilized to facilitate distribution of media via a geocast protocol.

FIG. 4A depicts exemplary geocast region comprising a single point.

FIG. 4B depicts an exemplary geocast region defined by a point in combination with a radius.

FIG. 4C depicts an exemplary geocast region formed from a series of points interconnected with straight boundary lines FIG. 4D depicts an exemplary geocast region comprising a specific floor of a building.

FIG. 4E depicts an exemplary geocast region comprising a specific floor of a building.

DETAILED DESCRIPTION

Figure 1:
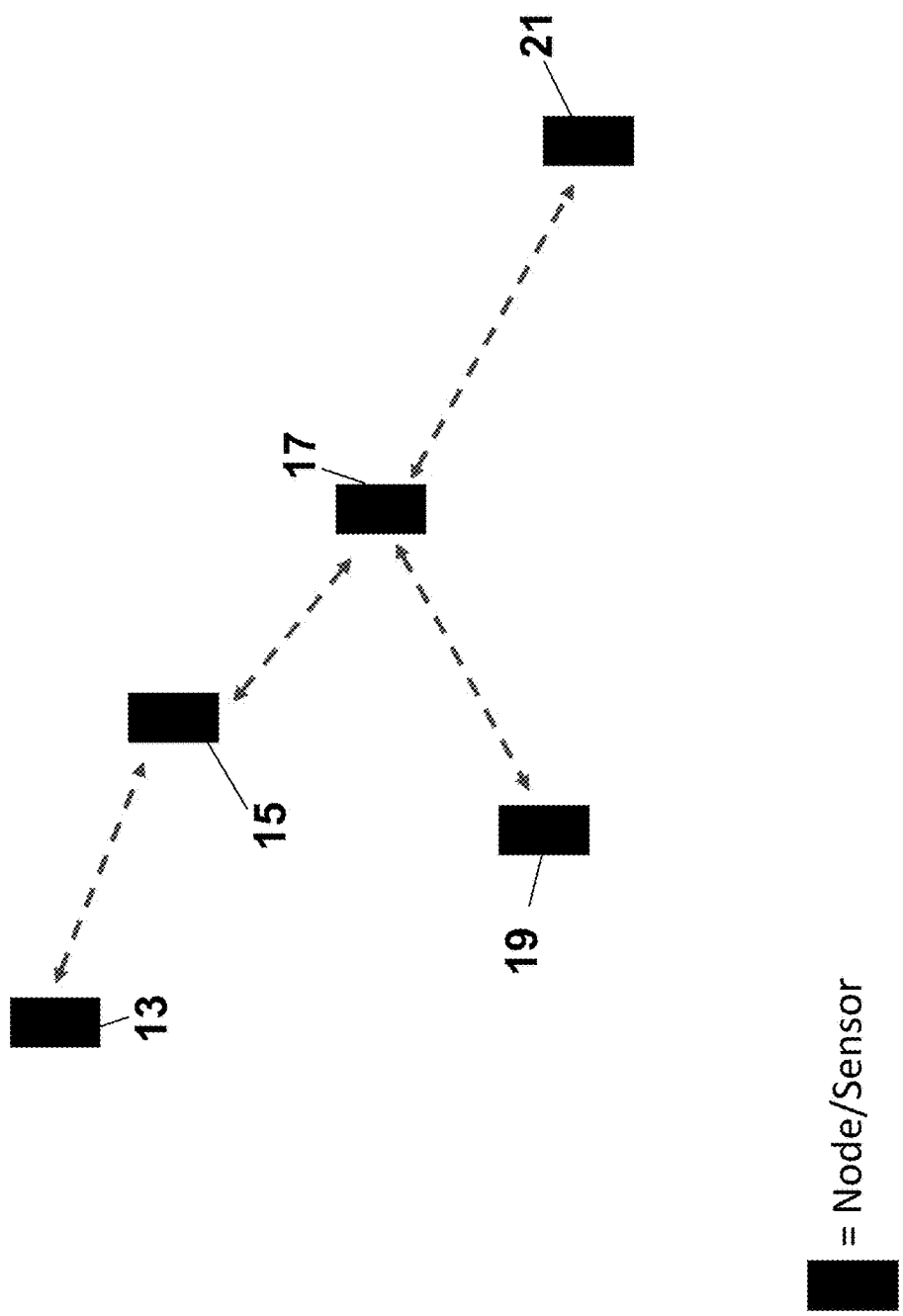
FIG. 1 illustrates an example mobile ad hoc network in which a mobile device configured to facilitate distribution of media via an ad hoc geographic routing/broadcast (geocast) protocol may be implemented.

Aspects of the subject disclosure will now be described more fully hereinafter with reference to the accompanying drawings, in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein. Like numbers refer to like elements throughout.

As described herein, voice information may be provided via a geocast protocol, according to an example embodiment. In an example embodiment, voice information may comprise any form or combination of sounds or audio, whether provided alone or in conjunction with other data such as, but not limited to, video, images, text, and the like. Example voice information may be generated or originated by one or more individuals, computers (e.g., text-to-speech converters, etc.), or any combination thereof.

In an example embodiment, voice information may be formatted into a geocast packet payload(s) and delivered to an addressed region via the geocast protocol. A packet may be geocast to a specified region. During a packet's traversal from sender to each recipient, that traveled path may be maintained, according to an example embodiment. A recipient of the packet can utilize the reverse of the acquired network path in order to initiate/reply. Utilizing the reverse path may be an efficient mechanism for achieving two-way communications.

Providing media via a geocast protocol as described herein may allow the propagation of voice over data networks, removing the need for allocating bandwidth exclusively to voice channels and greatly increasing the number of concurrent conversations or messages that can coexist in an environment, according to an example embodiment. Ad hoc networking may provide an ability to operate in the absence of coverage by network infrastructure such as 3G; 4G, or the like. Ad hoc networking may also provide an ability to operate in remote environments (e.g., gaming, emergency response, military applications). Scalability may imply that a geocast based solution can operate more efficiently than less efficient network solutions in highly dense or high-traffic situations, according to an example embodiment.

In an example embodiment, near field communications technology (e.g., WiFi, 802.11 standard compliant, Bluetooth, Bluetooth Low Energy, etc.) may be utilized to form an adhoc network of devices (e.g., mobile devices, handsets, smart phones, laptops, etc.). Each device can transmit data to a cluster of devices that is located in a particular region. In addition, any device located between a source and an intended target device (e.g., intended recipient) can function as a router with the ability to forward data packets toward the intended destination. The devices of the adhoc network form a geocast network cloud allowing any device within the cloud to communicate with any other device in the cloud.

In an example configuration, devices form a network wherein the devices of the network can constantly change position. Thus, the transmission path through the network can be constantly changing. Using location information about devices, the geocast protocol adapts to the changing conditions. Any appropriate wireless technology can be utilized, and as such, providing media via a geocast protocol is not limited to WiFi, 802.11 standard compliant, Bluetooth, and/or Bluetooth Low Energy technologies. Additionally, any appropriate location determination mechanism may be used to determine a location of a device. Example location mechanisms include the Global Positioning System (GPS), assisted GPS (A-GPS), time difference of arrival calculations, configured constant location (in the case of non-moving nodes), or any combination thereof.

In an example configuration each geocast packet may have embedded location information to identify the originator of the message/packet, the intended target region, and the immediately previous device that relayed the data packet. When a device receives a geocast packet, the device can use the location information in the packet, as well as the device's location, to determine if the packet is to be provided to an application residing on the device, if the packet is forwarded to another device, or discarded.

As described in more detail below, the scalable ad hoc geocast protocol can operate entirely within one logical network channel (for example, within one WiFi channel); however tiered geocast, which is a multi-layered protocol using the scalable ad hoc geocast protocol as one or more subcomponents, implements long range extensions for the geocast system that can extend communication over the Internet via, for example, an uplink via a cellular system (e.g., 3G, 4G, etc.). A geocast packet that has a destination farther than a local near field technology (e.g., WiFi) (including routing) can be sent over selected long range extension enabled devices to another long range extension enabled device that is closer to the intended recipient of the packet. The distant long range extension enabled device can then use the scalable ad hoc geocast protocol to complete the transmission.

Any appropriate long range extension mechanism/technology can be utilized. For example cellular networks and/or a base station(s) with geocast capabilities can be utilized to provide long distance connectivity. For example, a base-station with geocast capabilities could be configured to utilize back-haul transmission mediums such as higher-power radio transmission and/or an internet. The base-station could serve as a hop-on/hop-off point for the geocast network.

In an example scenario, a user, using a map or the like, displayed on a device, can select a destination geographic region to which a voice-based message is to be delivered. The voice-based message can be generated/obtained by the device as the user speaks into a sensor (e.g., microphone) on the device. The user (originator) can initiate transmission of the voice-based message (e.g., tap a screen on the device, depress a button/soft key on the device, provide an audio command, etc.). A recipient of the message, upon receipt thereof, can choose not to respond to the message, respond only to the originator's geographic region (response can include a voice-based message or a non-voice-based message), or respond to the originator's geographic region and to the destination region such that all original recipients also receive the response (response can include a voice-based message or a non-voice-based message).

In various example embodiments, restrictions could be imposed such that communications are restricted to a particular device (or devices) within a geographic region. For example, if there are six devices in a targeted region, by adding device restrictions (in addition to geographic restrictions), one could establish a point-to-point communication between two devices and still maintain the benefits of a geocast network.

Applications of distribution of media via an ad hoc geographic routing/broadcast (geocast) protocol as described herein are numerous. For example, within a game implemented via an ad hoc geocast protocol, a player could send taunts to the other payers, form alliances, provide instructions, provide warnings, etc. Family members and/or friends could communicate while camping or otherwise out of range of any cellular infrastructure. In disaster, search, and/or rescue situations, in which cell coverage is limited, responders could communicate between themselves and receive information pertinent only to their response area. Distribution of media via an ad hoc geocast protocol could be incorporated into ruggedized programmable digital radios for military uses. These smart radios could have greater range and bandwidth than WiFi-enabled devices, and could use geocast technologies to securely communications between geographic regions. For example, a control station could instruct war fighters in area X to checkout building Y. Or, war fighters in area X could be warned that bunker Z is about to be hit. Or, a voice-based message could be geocast to a region, Q, asking if anyone is in region Q. Since the radios intelligently network and link thru each other, the range (or radio footprint) of an individual handset can be less than is required for standard point-to-point communications.

As previously mentioned, distribution of media via an ad hoc geocast protocol can utilize a scalable ad hoc geocast protocol to facilitate communications. Geocast is a network primitive supporting geographic addressing of messages. In an example embodiment, a device addresses each packet with a description of a physical area, such as, for example, a circle defined by (i) its center (e.g., identified by latitude and longitude, GPS coordinates, etc.) and (ii) its radius. The network can transfer the message to all devices (if any) currently located in that area. Packets are relayed from device to device using ad hoc networking techniques that do not require connection to infrastructure networks or base stations. In addition to the advantage of using ad hoc networking, supporting remote and naturalistic venues, the geocast protocol is scalable with a number of devices. Additionally, the geocast protocol can be used with long range networking if available, within the context of a tiered geocast protocol that allows long distance communications between vehicles.

To better understand distribution of media via an ad hoc geocast protocol, a description of geocasting is provided. In an example embodiment, geocasting refers to addressing, transferring, and delivering a message (e.g., query, response, etc.) via a network in accordance with a geocast protocol wherein the address comprises a geocast region, and/or other conditions. Geocasting can provide the ability to transfer a message, via a geocast protocol, from a sender to each member of a set of devices currently occupying the geocast region and, if applicable, satisfying appropriate conditions. Geocasting can provide very efficient tracking of sets of devices. Geocasting can allow a network to propagate a message completely without need for any centralized server based on local device information.

Geocasting can be particularly suited to facilitating communications without requiring connection to an infrastructure-based communications network. A mobile ad hoc network is an example of such a set of devices. Mobile ad hoc networks extend the reach of data networking into areas and scenarios in which infrastructure-based networking is impossible or impractical. Mobile ad hoc networks can allow networking among low resource nodes by allowing units to relay each other's short-range transmissions, instead of each unit transmitting long range directly to the destination.

A geocast protocol differs from a traditional Internet protocol (IP) in that messages may be addressed to a destination geocast region instead of an IP address, such as an UDP address. Utilizing the geocast protocol, devices in a target area do not need to register to a group address, as required of some other protocols. In some example embodiments, each geocast data packet is assigned, at origination, a globally unique packet serial number. The unique packet serial number is read by participating devices according to the protocol to, for example, determine whether a particular data packet is being received for a first time or has been received before. The packet serial number and all other packet information may be positioned in a header or body of the data packet.

Geocasting may be implemented with existing network infrastructure. Although basic geocasting via a single network (e.g., long-range network) enables communications in some situations where traditional networking is impractical or inadequate, it is in some embodiments preferable to selectively geocast over one or more of two or more networks (i.e., tiers) versus the flat configuration of a single network. The tiered geocast protocol provides the heuristics, or decision rules, for selectively propagating geocast data packets within a relatively short-range, peer-to-peer network, and bridging packets onto a long-range network for long-distance transport depending on various circumstances. In this example embodiment, each participating device and other device can implement forwarding rules, including geographical parameters, and a look-up table for use in implementing the rules.

In one embodiment, the geocast system may be configured such that a transmitting device receives a confirmation that a geocast data packet was transmitted successfully. For example, at least one of the devices in a geocasting destination region, even if not a device actively participating in responding to a query, could return a geocast confirmation data packet indicating that the packet was received by a device in the region. In one contemplated embodiment, although the protocol is based on a geographical address and not a device-specific address, a device-specific address, or other appropriate identifier, of a target device could be included in a geocast and the target device could initiate inclusion in a return geocast data packet of a confirmation of receipt message to the originator of the query.

In addition, in some embodiments, a geocast data packet includes one or more fields, such as in a header or body of the packet, in which information related to a path taken by a packet is recorded. For example, a receiving device receiving a geocast can retrieve data from the geocast header to identify an ordered list of the devices whose transmissions led to the receiving device receiving it. In this way, path discovery is integrated into the transmission process. Any device can also use this information to send a source-routed unicast back to any device along the path, which is termed reverse-path forwarding (RPF).

Although a two-tiered communication system, including a first short-range peer-to-peer network and a long-range network, is described herein, the information acquisition/access via a geocast protocol application of the present disclosure may be implemented in connection with a protocol and communication system using other types of networks as well as or instead of those described herein, and in connection with more than two network tiers.

Propagations over a short-range network are made between devices programmed with the geocast protocol, whereby adjacent devices are within range of each other, such as, for example, radio range (e.g., 100 meters). In example embodiments, the devices and geocast protocol are configured to transmit geocast data packets over one or more short-range networks, including existing wireless local area networks (WLANs), such an IEEE 802.11 network, or the like. As an example, when a first device is about 900 meters from an edge of a geocasting region including a second device, a geocast data packet from the first device could be geocasted and participating intermediate devices could receive and retransmit the geocast data packet until it reaches the geocast region, without need for transmission over an Internet router or other base station. In this example, depending on the location of a retransmitting device, the geocast data packet can be broadcast to the geocast region in one or two hops.

To better understand distribution of media via an ad hoc geocast protocol and applications thereof, a description of mobile ad hoc networks is provided.

In an example embodiment, a mobile ad hoc network comprises communications devices (also referred to as nodes, or mobile devices) that communicate with each other via geographical broadcasting, referred to as geocasting. Geocasting is described in U.S. Pat. No. 7,525,933, entitled "System And Method For Mobile Ad Hoc Network," filed Nov. 30, 2005, issued Apr. 28, 2009, and is incorporated by reference herein in its entirety. In an example embodiment, geocasting may use a protocol in which an IP address is replaced with a geographic address. Thus, each geocast message may comprise an indication of a location of a geographic region of intended reception of the geocast message. Generally, a packet is sent to every communications device located within a specific geographic region. The packet can contain an indication of the location of the sender, an indication of the geographic region, a payload, or a combination thereof, or the like. The communications devices in the geographic region, and any other communications devices that can communicate with them, are referred to, collectively, as a mobile ad hoc network. In an example embodiment, no registration may be required to become a member of the mobile ad hoc network. Any communications device in the mobile ad hoc network can send a message to any or every communications device in the mobile ad hoc network. As communications devices move within communications range of any member of the mobile ad hoc network, they can become members of the mobile ad hoc network without requiring registration. The communications devices of the ad hoc network of communications devices communicate with each other. The ad hoc network of communications devices does not require base station terminals to control communications between the mobile devices. In example embodiments, base stations or routers may be used to relay messages between different mobile ad hoc networks, or to use other network transports such as other traditional internet protocol networks, such as the internet, to bridge messages between mobile ad hoc networks. Each communications device is capable of receiving and/or transmitting data packets to and/or from other communications devices in the mobile ad hoc network.

In an example embodiment, a communications device may transfer packets to other communications devices according to heuristic decision rules that determine whether a receiving device will re-transmit a received packet. These decision rules may effectively guide packets to their destinations and control communication traffic within the ad hoc network. The decision rules may achieve this control by using statistics obtained and recorded by a communications device as it receives packets transmitted within reception range within its environment. This distributed packet transfer mechanism may result in packets "flowing" to and throughout the geocast region specified in each packet. The communications devices in the geocast region receive and process each distinct packet, typically rendering the content to the user via a user interface of a communications device. Two packets are distinct if they contain distinct geocast identifiers. However, a re-transmitted copy of a packet generally will contain the same geocast identifier as the original packet.

FIG. 1 illustrates an example mobile ad hoc network in which a mobile device configured to facilitate distribution of media via an ad hoc geographic routing/broadcast (geocast) protocol may be implemented. Communications devices, also referred to herein as devices, mobile devices, or nodes, in the mobile ad hoc network can communicate via RF encoded with geographic information, via Bluetooth technology, via WiFI (e.g., in accordance with the 802.11 standard), or the like, or any combination thereof. For example, as depicted in FIG. 1, communication devices 13, 15, 17, 19, and 21 form a mobile ad hoc network. As shown in FIG. 1, communication device 13 communicates with communications device 15 directly (e.g., via Bluetooth). Communication device 15 communicates with communications device 17, and thus can retransmit information received from communications device 13 to communications device 17, and vice versa (retransmit information received from communications device 17 to communications device 13). Communications device 17 communicates with communications devices 19 and 21, and can relay information from/to communications devices 19 and/or 21 to/from communications devices 13 and/or 15.

Although not depicted in FIG. 1, it is possible, in a mobile ad hoc network, that, for a pair of nodes (A and B for example), node A can receive from node B but node B cannot receive from node A. In an example embodiment, this asymmetric style of communication may be potentially likely in a mobile ad hoc network.

In an example embodiment, communications devices that receive a message, such as a query or a response, can resend the query/response in accordance with the scalable wireless geocast protocol. For example, a communication device's ability to retransmit a query/response can be based on the number of times the query/response was previously received, the communication device's proximity with respect to the communications devices from which the query/response was sent, and/or the communication device's proximity to the geocast region. This can be implemented as a three step location-based approach, which is described in detail in the aforementioned U.S. Pat. No. 7,525,933, entitled "System And Method For Mobile Ad Hoc Network," filed Nov. 30, 2005, issued Apr. 28, 2009. First, in accordance with the location-based approach, the receiving communication device determines whether it has previously received the same query/response at least a predetermined number (N) of times. If not, it retransmits the query/response over the ad hoc network of communications devices. If so, the communications device progresses to the second step and determines whether the sending communications device is closer than some minimum distance away. If no prior transmitter of the query/response was closer than some minimum distance away, the communications device retransmits the query/response over the ad hoc network of communications devices. Otherwise, the communications device progresses to the third step and determines whether it is closer to the center of the geocast region than any sending communications device from which the query/response was received. If so, the communications device transmits the query/response over the ad hoc network of communications devices. If not, the communications device does not retransmit the query/response.

This location-based approach prevents the receiving communications device from retransmitting a message that was most likely already retransmitted by another communications device located close to it (and thus most likely reaching the same neighboring communications devices that it can reach). In addition, this location-based approach reduces the chance that the communications device will retransmit the same message multiple times to the same neighboring communications devices.

As mentioned above, a mobile ad hoc network does not require a communications network infrastructure or a WiFi access point. However, in an example configuration, a mobile ad hoc network can utilize WiFi access points and/or a communications network infrastructure.

Figure 2:
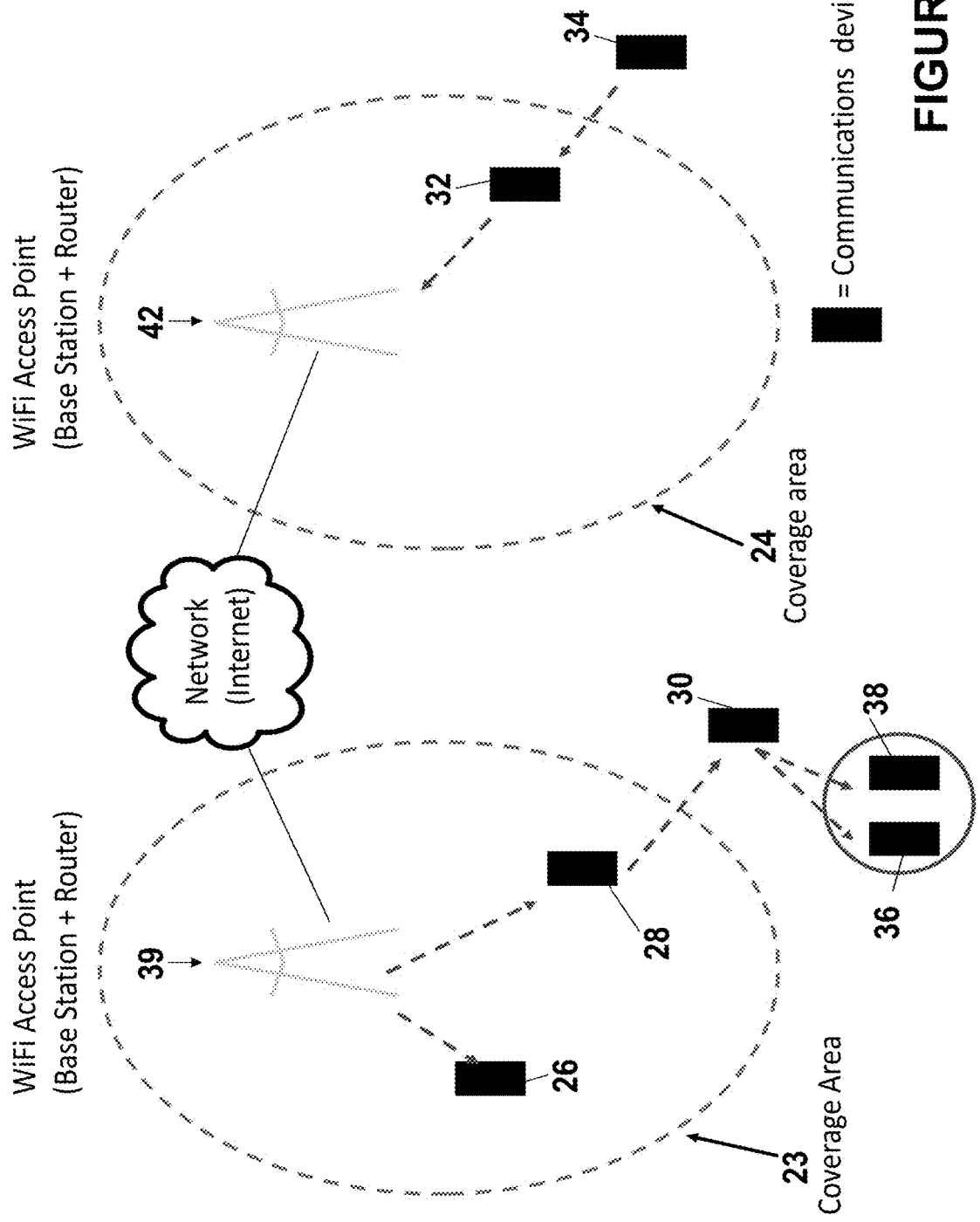
FIG. 2 illustrates an example ad hoc network utilizing a WiFi access point.

FIG. 2 illustrates an example ad hoc network utilizing a WiFi access point. As depicted in FIG. 2, communication devices 26, 28, 30, 36, and 38 form a mobile ad hoc network and communication device 32 and 34 form another mobile ad hoc network. Coverage area 23, which is the area covered by a WiFi access point 39, covers communication devices 26 and 28. Coverage area 24, which is the area covered by another WiFi access point 42 covers communication device 32. As shown in FIG. 2, communication device 34 transmits to communication device 32 directly (e.g., via Bluetooth). Communication device 32 retransmits to a WiFi access point 42 which in turn may retransmit to the other WiFi access point 39 via a network such as the Internet, for example. Communication devices 26 and 28 receive the transmission from the WiFi access point 39, and communication device 28 retransmits directly to communication device 30. And, as depicted, communication device 30 retransmits to other communication devices 36 and 38.

Figure 3:
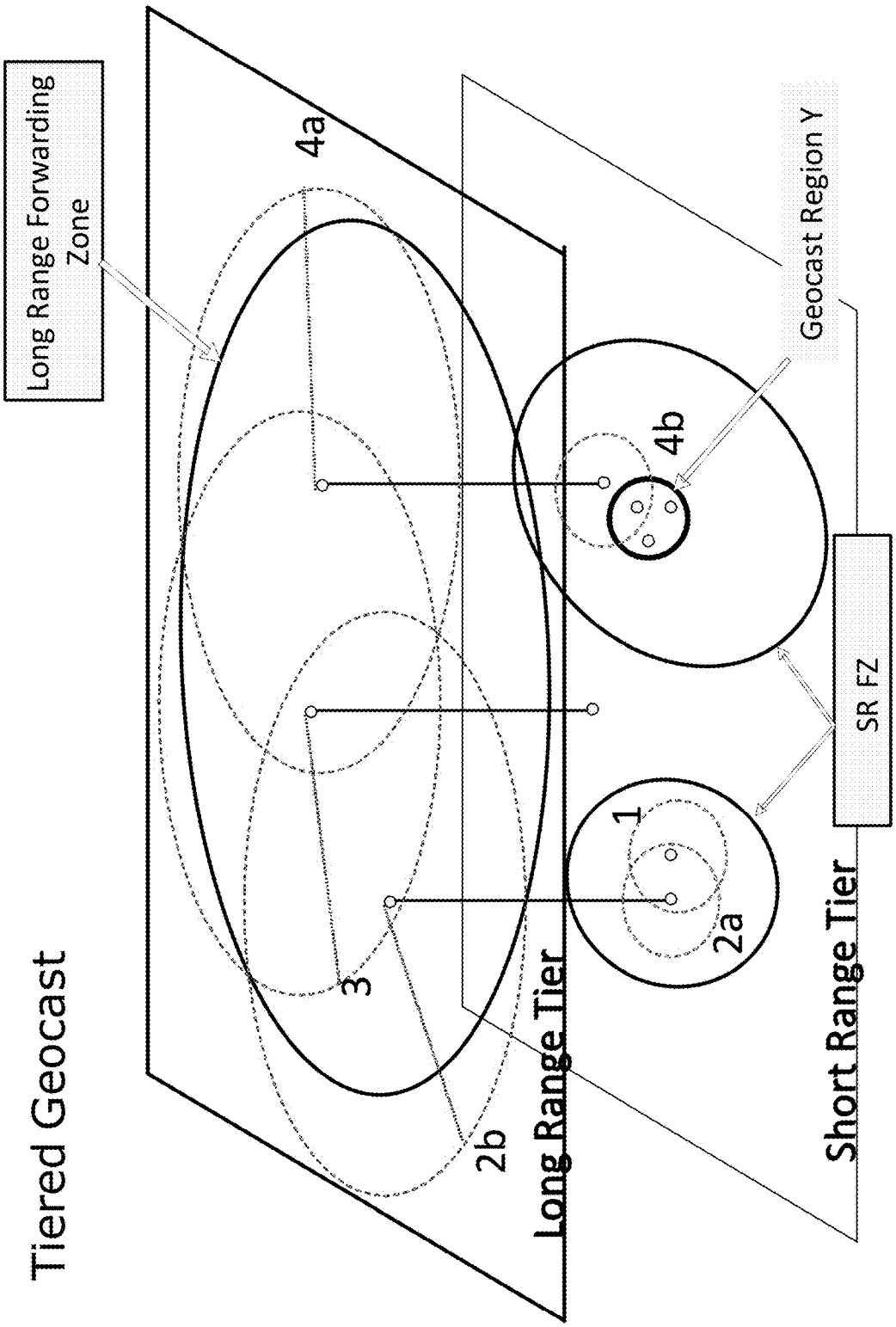
FIG. 3 illustrates an example mobile ad hoc network in which distribution of media via an ad hoc geographic routing/broadcast (geocast) protocol can be implemented utilizing tiered geocasting and forwarding zones.

FIG. 3 illustrates an example mobile ad hoc network in which distribution of media via an ad hoc geographic routing/broadcast (geocast) protocol can be implemented utilizing tiered geocasting and forwarding zones. Tiered geocasting uses long range (LR) transmitters (such as communications devices, etc.), infrastructure, a communications network, a cellular tower, or a combination thereof, when available. Tiered geocasting assumes that at least one tier is usable by at least one of the communications devices. A long range tier is a tier wherein characteristic message transfers between devices occur over a longer physical range than those over some other tier. A long range tier can be wireless, wired, or a combination thereof.

A forwarding zone can be utilized to implement tiered geocasting. A common forwarding zone can be defined for all geocast packets or different forwarding zones can be defined for each type of geocast packet. Forwarding zones (as shown in FIG. 3, for example and without limitation) can be defined differently in different tiers, even for the same packet type or even same packet. Thus, forwarding heuristics can be applied independently per tier, with bridging at multi-tier capable nodes. In an example embodiment, a communications device retransmits a packet only if the communications device is located within the forwarding zone defined for the packet's type. This determination is in addition to the determinations described above and, if the communications device is not in the forwarding zone, the packet will not be retransmitted, even if one or more of the above conditions would otherwise have caused a retransmission hold.

As depicted in FIG. 3, nodes (e.g., communications devices) D1, D2, D3, D4, D5, D6, and D7, are at various locations within short range (SR) and long range (LR) tiers. All of devices D1, D2, D3, D4, D5, D6, and D7 together form a mobile ad hoc network, with devices D5, D6, and D7 being located in geocast region Y, hence being targets of a message sent by D1. Each communications device D1, D2, D3, D4, D5, D6, and D7 can determine its own geographical location through any type of location determination system including, for example, the Global Positioning System (GPS), assisted GPS (A-GPS), time difference of arrival calculations, configured constant location (in the case of non-moving nodes), any combination thereof, or any other appropriate means. Each communications device is operable to transmit and receive packets on a mobile ad hoc network. In addition, at any given time, some subset (possibly all) of the communications devices may be operable to transmit and receive packets over the long range tier network. For example, though not a limitation, in FIG. 3, devices D2, D3, and D4 can transmit and receive messages over both the short and long range tiers. Note that this latter fact is indicated visually in the diagram by D2, D3, and D4 each having two dots (one in the short range tier and one in the long range tier) connected by a vertical line. The long-rang tier network can be any network in which packets can be transmitted from one long range capable communications device to another long range capable communications device. Such packet networks can include, for example, an infrastructure-based network comprising wireless base stations (for up- and down-link) operating on a separate frequency from that used by an ad hoc network. In addition, the long rang tier network also could be implemented simply as another instance of an ad hoc network using distinct radio frequencies and possibly longer radio ranges.

Communications device D1 transmits the message, and communications device D2 receives the transmission from communications device D1. Communications device D2 retransmits (transmission 2a), within the short range tier and in accordance with the heuristics for the short range forwarding zone (SRFZ) as well as within the long range tier (transmission 2b). Communications D2, with long range transmission capability (in the long range tier) retransmits in the long range tier as well (transmission 2b). Communications device D3 receives the transmission 2b from communications device D2 and retransmits (as transmission 3) in the long range tier only. Communications device D4 receives the transmission 3 from communications device D3 and retransmits both on the long and short range tiers, resulting in transmission 4a in the long range tier and 4b in the short range tier. Communications device D5, within geocast region Y, receives the transmission 4a, and in turn retransmits (transmission 5) within the geocast region Y. Transmission 5 is received by the other devices in geocast region Y, namely devices D6 and D7, thus completing the geocast message transfer.

Geocast origination, destination, and termination regions can be defined by geographic parameters and may have any size and shape. As examples, the regions may be defined by three or more bounding geographic coordinates, forming a triangle, rectangle, or other shape, or a single geographic coordinate and a radius or diameter, forming a geocast region.

FIG. 4, comprising FIG. 4A, FIG. 4B, FIG. 4C, FIG. 4D, and FIG. 4E depicts example geocast regions or boundaries which can be utilized to facilitate distribution of media via a geocast protocol. A geocast region may be defined to be a single point 40, as depicted in FIG. 4A. A point geocast region may be defined by a longitude value and a latitude value (not shown). A point above the surface of the earth could be defined by providing an altitude value in addition to longitude and latitude values. A geocast region may also comprise multiple single points (not shown) such as the single point 40. Location points such as point 40 may be used as the building blocks for more complex geocast region geometries, as described herein. FIG. 4B depicts a geocast region defined by a point 40 in combination with a radius 42. The geocast region of this example will comprise the area enclosed by the radius, and may include the space above the area as well. A geocast region could also be defined as the overlap region between two or more circular geocast regions (not shown). FIG. 4C depicts a more complex geometry formed from a series of points 40 interconnected with straight boundary lines. This technique of geocast region definition is similar to the techniques typically used in the definition of parcels of real property. FIGS. 4D and 4E depict the creation of one or more geocast regions within a single geographic footprint. FIG. 4D depicts creating a geocast region for a specific floor of a building 44. The single floor geocast region is defined as the volume of space between upper and lower areas, each formed using a series of points 40 set at corners of the buildings. FIG. 4E depicts an alternate technique for defining a single floor geocast region in building 44. Upper and lower points 40 are defined in the middle of the ceiling and the floor of the geocast region respectively. The single floor geocast region is then defined as the volume of space between an upper area and a lower area defined by a pair of radii 42 extending from the middle points. Geocast regions may also be defined to change in size, geographic location, etc. with time (not shown), essentially allowing the creation of geocast regions in four dimensions. For example a region may be defined to change size, shape, and/or geographic location over time as the number of participating nodes fluctuates. Information defining a particular geocast region (e.g., a series of points) can be communicated in an addressing portion of a geocast message. Geocast sub-regions may be defined within a particular geocast region using the above techniques. It should be noted that the techniques described with reference to FIGS. 4A-4E are merely examples, and the scope of the instant disclosure should not be limited thereto. Other region geometries and techniques for defining regions may be recognized by those skilled in the art, and are meant to be included within the scope of the instant disclosure.

In some embodiments, a geocast region can be selected by making one or more selections on a map and/or from a list. A region can be selected from a list displayed on a mobile communications device, or the like. The list can comprise real world locations. For example, one can scroll through a list by touching the display surface of a mobile communications device, or the like, by providing a voice command (e.g., "Scroll List"), by entering text on which to search, by moving the device, or any appropriate combination thereof. In another example embodiment, the selection of a region, or the like can be made by selecting a location on the map by a finger, fingers, and/or any other appropriate device, and, for example, dragging away or gesture-pinching, from the selected location to create the size of the a circle, oval, rectangular, square, polygon, or any appropriate shape (two dimensional or three dimensional) representing a destination, termination, boundary, region, or the like. In various example embodiments, locations, such as addresses, and/or region dimensions, building names, institution names, landmarks, etc. may be input in other ways by a player, such as by typing, gesture, and/or voice input. Indeed, many variations of textual, graphical, and audio inputs, either alone or in combination, may be utilized for selecting a geocast region in accordance with example embodiments of the present disclosure.

Figure 5:
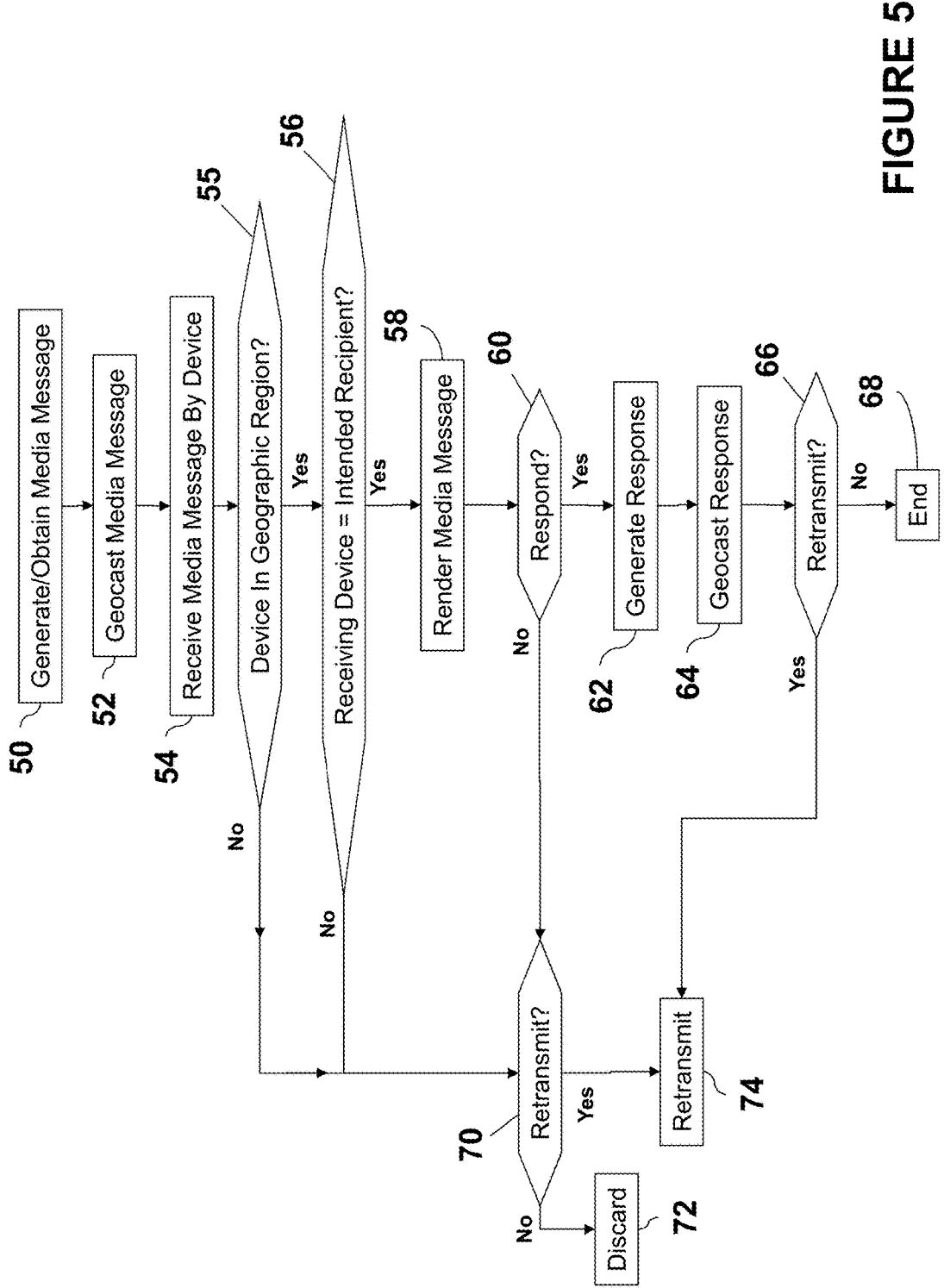
FIG. 5 is a flow diagram of an example process for distributing media via an ad hoc geocast protocol.

FIG. 5 is a flow diagram of an example process for distributing media via an ad hoc geocast protocol. A media message is generated and/or obtained at step 50. The media message can be obtained in any appropriate manner from any appropriate source. For example, the media message can be a prerecorded message or a message obtained in real time. The media message can include a media stream, audio data, voice-based information, image data, graphics data, video data, multimedia data, etc. Media can be in any appropriate format, such as, for example, prerecorded, live, synchronous voice conversations, or the like. For example, the media could be obtained from a prerecorded voice-based message, the voice-based message can be generated in real time as a user of a device speaks into the device, or any combination thereof. The media can be provided to all devices, or a specific device(s), in a specified geographic region. The media message can include any appropriate information, such as, for example, an indication of a geographic region to which the message is being sent, an indication of a specific intended recipient device, an indication of a specific intended recipient devices, the voice message, and/or an indication of the location of the device sending the media messages, or any combination thereof. The media message can be in any appropriate format. Example audio formats for formatting the voice message include MP3 (MPEG layer-3), MP2 (MPEG layer-2), WMA (windows media audio). WAVE, OGG (Ogg Vorbis), FLAC (free lossless audio coded), Monkey's Audio, MusePack, AIFF (audio interchange file format). TTA (true audio lossless codec). OFR, VOX, or the like, or any appropriate combination thereof.

The media message may be geocast at step 52. In an example embodiment, contents of the media message can be encrypted, obfuscated, or the like prior to being geocast. The media message can be geocast to any appropriate region, location, intended recipient, or the like. The geocast media message may be received by a device at step 54. It is to be understood that the geocast media message may be received by multiple devices and the process depicted by steps 54 et seq, in FIG. 5 could occur for each device that receives the geocast media message.

At step 55, it can be determined if the device that received the media message is in the target geographic region. This can be accomplished via any appropriate mechanism as described herein. For example, if the media message is geocast to a target geographic region, the receiving device can analyze the received media message to determine the target geographic region. The receiving device can compare its location (current and/or recent) to the target geographic region to determine if it is within the target geographic region. If the receiving device in not in the geographic region, the process can proceed to step 70 (described in more detail below). It the receiving device is within the target geographic region, the process can proceed to step 56.

At step 56, it can be determined if the device that received the media message is an intended recipient (intended receiving device). This can be accomplished in any appropriate manner. For example, if the receiving device is in the target geographic region, the receiving device could be deemed an intended recipient, and if the receiving device is not within the target geographic region, the receiving device may not be deemed as an intended recipient. Thus, the media message could be intended for all devices within a target region. In another example embodiment, the receiving device can analyze the received media message to determine if the media message also comprises an indication of an intended recipient device or intended recipient devices. If the media message comprises an indication of an intended recipient device or intended recipient devices, the receiving device can determine if it is one of the intended recipient devices. Accordingly, if the receiving device is within the target geographic region and it is one of the intended recipient devices, the receiving device is an intended recipient. Otherwise, the receiving device is not an intended recipient. That is, if the media message comprises an indication of an intended recipient device or intended recipient devices, and the receiving device is either not within the geographic region or not one of the intended recipient devices, the receiving device is not an intended recipient. Any appropriate information can be used to designate an intended recipient device, such as, for example, an identifier unique to a device (e.g., a serial number, a password stored thereon, a username stored thereon, an assigned moniker, or the like), a phone number of a device, a password or the like assigned to a device, an mobile station international subscriber directory number (MSIDN) of a device, or the like, or any combination thereof.

If it is determined, at step 56, that the receiving device is not an intended recipient, at step 70, it may be determined if the device that received the media message is to retransmit (geocast) the media message. The criteria for determining if a media message is to be retransmitted are described in more detail below. If it is determined, at step 70, that the media message is to be retransmitted, the media message may be retransmitted (geocast) at step 74. If it is determined, at step 70, that the media message is not to be retransmitted, the media message may be discarded at step 72.

If it is determined, at step 56, that the receiving device is an intended recipient, contents of the media message may be rendered on the receiving device at step 58. In an example embodiment, if contents of the media message were encrypted, obfuscated, or the like, the contents may be decrypted, de obfuscated, or the like prior to rendering. Contents of the media message can be rendered in any appropriate manner. For example, content of the media message can be rendered audibly via a speaker, earphones, or the like, contents of the media message can be rendered visibly on a display (e.g., audio can be converted to text for the hearing impaired), contents of the media message can be rendered mechanically via vibration, such as in Morse code or the like, or any combination thereof.

It can be determined if a response is to be generated at step 60. The determination to generate/send a response or not generate/send a response can be accomplished in an appropriate manner. For example, a user of the receiving device can decide to send a response or not send a response, the receiving device could be configured to automatically send a response (e.g., verification that a media message was received), the receiving device could be configured to automatically send a response to designate devices and/or regions. If it is determined, at step 60, that a response is not to be generated, the process proceeds to step 70 and can continue as previously described.

If it is determined, at step 60, that a response is to be generated, a response may be generated at step 62. A response can comprise any appropriate information, such as, for example, a media message, a text message, a multimedia message, a current or recent location of the receiving device, or any combination thereof. Additionally, a response can be directed only to the originator's geographic region; or to the originator's geographic region and to the destination region such that all original recipients also receive the response.

The response can be geocast at step 64. At step 66, it can be determined if the received media message is to be retransmitted. If it is determined, at step 66, that the received media message is to be retransmitted, the received media message may be retransmitted at step 74. If it is determined, at step 66, that the received media message is not retransmitted, the process can end at step 68.

In an example embodiment, each time a geocast packet is originated by a device, the geocast packet may be assigned an identifier (e.g., globally unique identifier). The originating device (originator) can broadcast the geocast packet, with the packet header including, for example, originator location, a definition of the geocast region (e.g., center and radius for circular geocast regions, etc.), and other appropriate fields. Each device receiving a broadcast geocast packet stores the packet for a period of time. Storing a received packet can be accomplished in any appropriate manner. For example, the receiving device can generate a table entry comprising the received packet. In an example embodiment, the table entry can be short-lived (e.g., 10 seconds). The receiving device queues the packet for retransmission. In an example embodiment, an amount of time is allowed to pass before queuing the received packet for retransmission. The amount of time can be any appropriate amount of time. For example, the amount of time could be a random amount of time or a pseudo random amount of time. This amount of time may be referred to herein as a backoff time, backoff delay, or rolling backoff time. Waiting an amount of time before queuing the received packet for retransmission facilitates desynchronization of retransmissions among peer devices (avoid collisions). When the backoff delay expires, the device applies a heuristics check to decide whether retransmit the received geocast message or not to retransmit the received geocast message.

Figure 6:
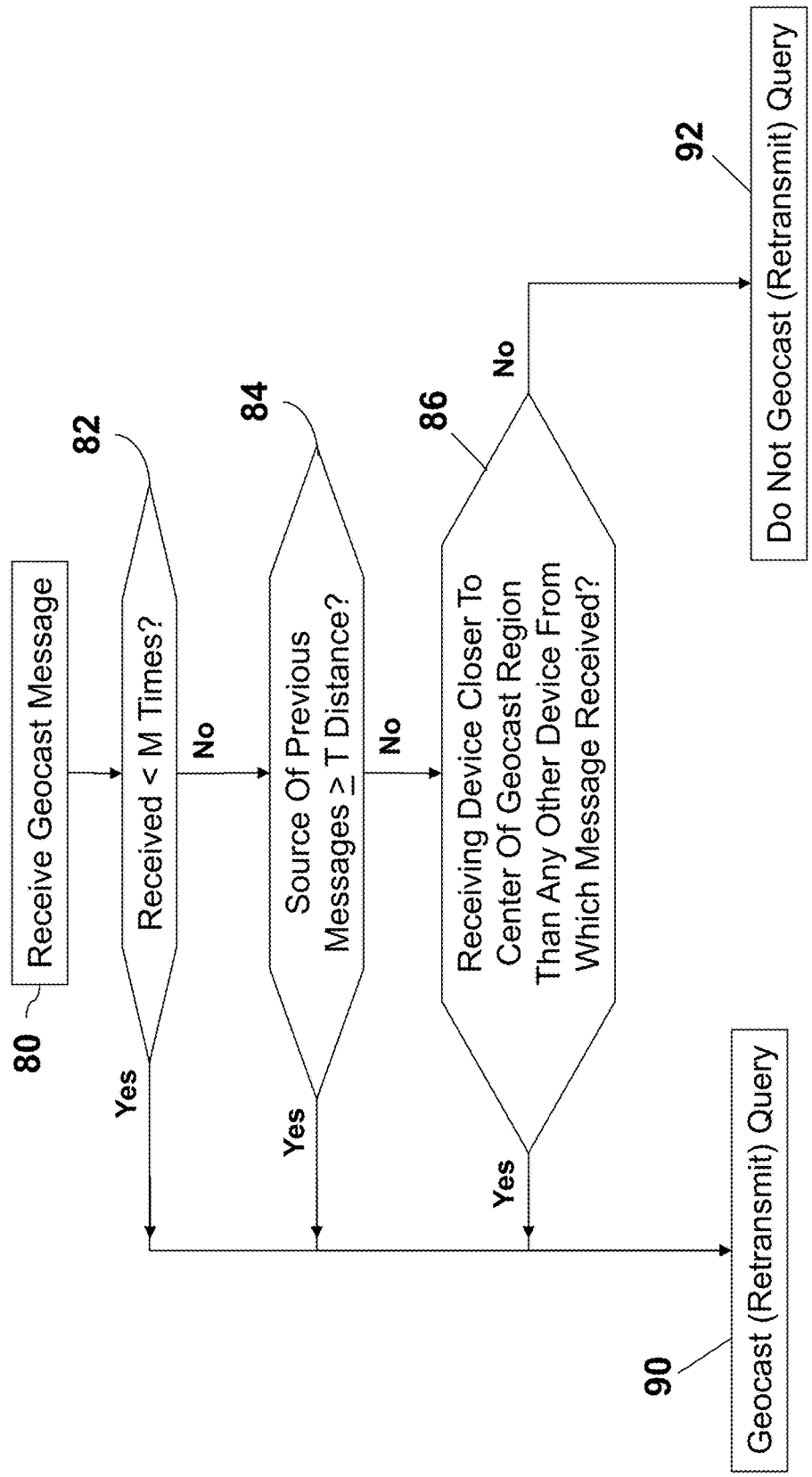
FIG. 6 is a flow diagram of an example process for determining whether to retransmit or not to retransmit a received geocast media message.

FIG. 6 is a flow diagram of an example process for determining whether to retransmit or not to retransmit a received geocast voice-based message. A geocast message is received by a device at step 80. At step 82, it is determined if the received geocast message has been received a predetermined amount (M) of times. This determination is referred to herein as the M heuristic. The number of copies of each geocast message (e.g., transmissions having the same identifier) received by the device is counted. If this number is less than a parameter M (e.g., 2 for example), the device will transmit (geocast) the received geocast message. The M heuristic provides an efficient suppression mechanism in dense networks and makes the ad hoc geocast protocol scalable with node density. The M heuristic limits the number of transmissions in a local neighborhood, avoiding redundant transmissions and preventing congestion in the network. The M heuristic also provides redundancy in sparse networks. The M heuristic also helps the propagation get out of local minima it might otherwise be stuck in by hill climbing directly toward the destination. Thus, if it is determined, at step 82, that the geocast message has been received less than the predetermined amount (M) of times, the message is retransmitted (geocast) at step 90. If it is determined, at step 82, that the geocast message has not been received less than the predetermined amount (M) of times, the message is not retransmitted (geocast). And, the process proceeds to step 84.

At step 84, it is determined if the source of a geocast message is greater than or equal to a predetermined distance, T, from the receiving device. This determination is referred to herein as the T heuristic. The T heuristic keeps track of how far away each copy of a geocast message is received from (using, for example, the sender location which is included in the geocast packet header). If all previously received copies were sent from devices that were at least a predetermined distance (e.g., 40 meters for example) away, the receiving device retransmits (geocasts) the message. A motivation for implementing the T heuristic is that if a node is sufficiently further away from all previous transmitters of a given geocast, the transmission from this node has a better chance of reaching nodes around corners and those that are not covered by previous transmitters. As a result, it helps to spread the geocast to distant areas not yet covered. Accordingly, if it is determined, at step 84, that the sources of all previously received copies of the geocast message are greater than or equal to a predetermined distance away, the message is retransmitted (geocast) at step 90. If it is determined, at step 84, that the sources of all previously received copies of the geocast message are not greater than or equal to a predetermined distance away, the message is not retransmitted (geocast). And, the process proceeds to step 86.

At step 86, it is determined if the receiving device is closer to a center point of a geocast region than any other device from which the geocast message was received. This determination is referred to as the CD heuristic herein. In an example embodiment, the receiving device determines a first distance from the receiving device to a point (e.g., the center point) in a geocast region. The receiving device also determines a plurality of distances between the point and each of a plurality of devices from which the receiving device has previously received a geocast message having an identifier that is the same as an identifier of the received geocast message. The receiving device will retransmit the received packet if the first distance is less than each of the plurality of distances. One of the problems that a geocast scheme needs to counter in the context of vehicular networks is that of obstacles. This is especially true in urban vehicular networks where a vehicle may not have a line of sight contact with another vehicle because of obstacles even if they are physically close to each other. The CD heuristic causes a node to forward a geocast message even if it has heard more than the threshold number of transmissions (M heuristic) from nodes which are within T distance from it. As a result, even if the transmissions from previous transmitters do not help in progressing the geocast message to its destination area (due to obstacles), the transmission from the node helps significantly to forward the message to the destination area Accordingly, if it is determined, at step 86, that the receiving device is closer to a center point of a geocast region than any other device from which the geocast message was received, the message is retransmitted (geocast) at step 90. If it is determined, at step 86, that the receiving device is not closer to a center point of a geocast region than any other device from which the geocast message was received, the message is not retransmitted (geocast) at step 92.

It is to be understood that the order in which determinations are made, as depicted in FIG. 6 is exemplary. Determination can be made in any appropriate order.

Figure 7:
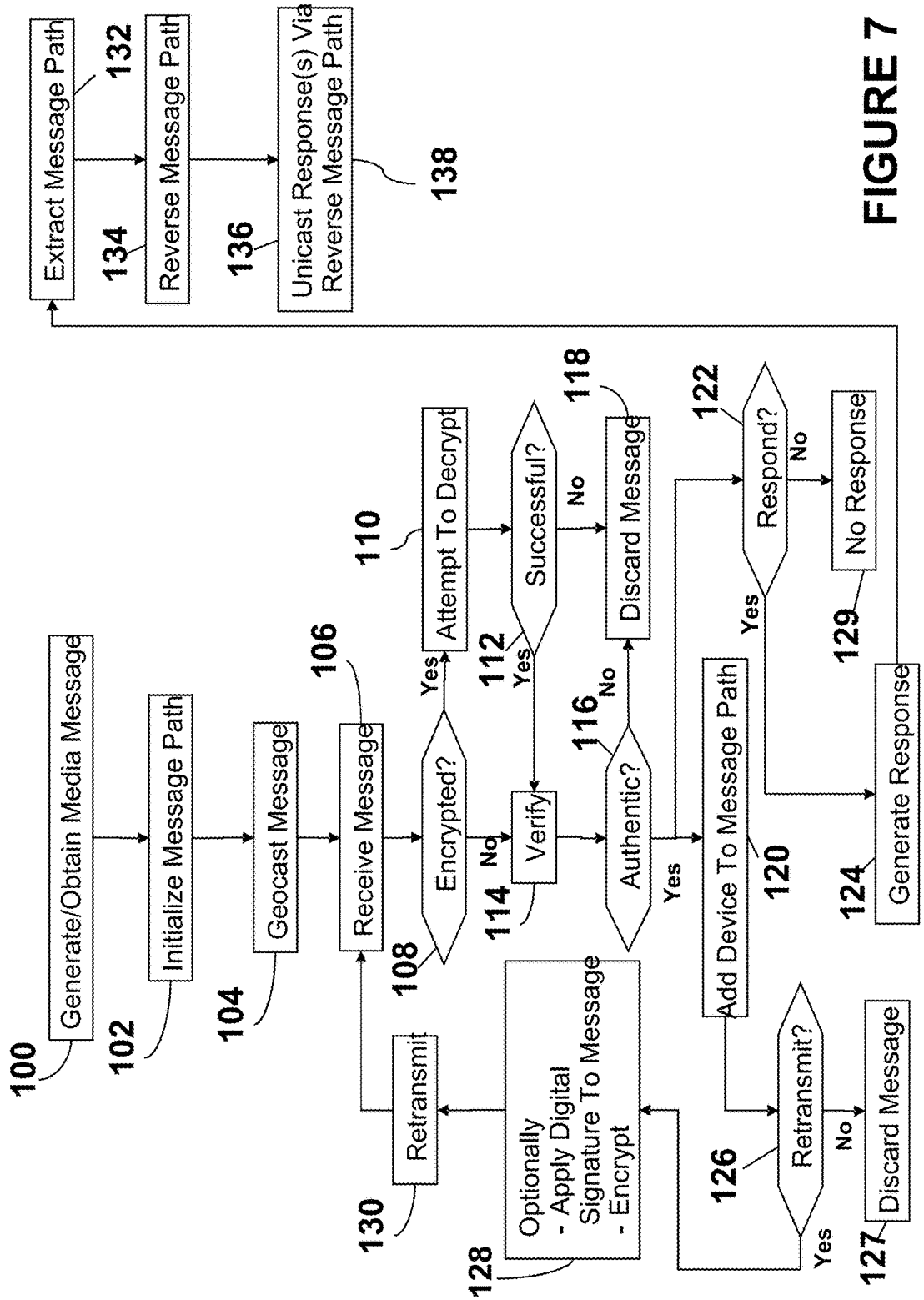
FIG. 7 is a flow diagram of an example process for providing a media message via a geocast protocol utilizing reverse path forwarding.

FIG. 7 is a flow diagram of an example process for providing a media message via a geocast protocol utilizing reverse path forwarding. A media message can be generated/obtained at step 100. The media message can be generated/obtained by the device in real time as the user speaks into a sensor (e.g., microphone) on the device, the voice-based message can be obtained from a prerecorded voice-based message, or any combination thereof. The media message can comprise, as described above, any appropriate information, such as, for example, an indication of a geographic region to which the message is being sent, an indication of a specific intended recipient device, an indication of a specific intended recipient devices, the voice message, and/or an indication of the location of the device sending the media messages, or any combination thereof. The voice message can be in any appropriate format. Example audio formats for formatting the voice message include MP3 (MPEG layer-3), MP2 (MPEG layer-2), WMA (windows media audio), WAVE, OGG (Ogg Vorbis), FLAC (free lossless audio coded), Monkey's Audio, MusePack, AIFF (audio interchange file format), TTA (true audio lossless codec), OFR, VOX, or the like, or any appropriate combination thereof.

The path of the media message is initialized at step 102. The path is initialized with an indication of the device sending the message. Thus, an indication of the device sending the media message is included in the message.

The media message is geocast at step 104. The media message can be geocast to any appropriate region, location, device, or the like. The geocast media message is received by a device at step 106. It is to be understood that the geocast media message can be received by multiple devices and the process depicted by steps 106 et seq. in FIG. 7 could occur for each device that receives the geocast media message. If contents of the media message were encrypted (at step 100), the receiving device attempts to decrypt the encrypted contents of the media message at step 110. If the attempt to decrypt the encrypted contents of the media message is not successful (step 112), the media message is discarded at step 118. If the attempt to decrypt the encrypted contents of the media message is successful (step 112), the media message can be verified at step 114 The media message can be verified to determine if the media message is authentic. In an example configuration, the media message is verified utilizing a digital signature, or the like, that was included when generating the media message (e.g., step 100). Verification utilizing a digital signature can be accomplished via any appropriate mechanism. For example, the media message or any appropriate portion or portions thereof can be operated on by a hash function to obtain a first hash value. The first hash value can be included with the media message. The first hash value may or may not be encrypted. At step 114, the same portion or portions of the media message can be operated on by the same hash function to obtain a second hash value. If the first hash value is the same as the second hash value, the media message can be determined to be authentic. If the first hash value is not the same as the second hash value, the media message can be determined not to be authentic. It is to be noted that verification and authentication are optional. It also is to be understood that the foregoing description of verifying the media message is an example, and not limiting. Any appropriate mechanism or technique for verifying the query/message may be used.

At step 116, if the media message is determined to be not authentic, the message is discarded at step 118. If the query/message is determined to be authentic (at step 116), the process proceeds along two paths. If the media message is determined to be authentic (at step 116), the current device is added to the message path at step 120. That is, an indication of the current device is added to the message. From step 120, the process proceeds to step 126 described below. Additionally, if the media message is determined to be authentic (at step 116), it is determined, at step 122, if there is a response is to be generated.

If it is determined, at step 122, that a response is not be generated, no response is sent (step 129). The determination as to whether the media message is to be retransmitted can be in accordance with the example descriptions of retransmission determination as described herein and/or as described in the aforementioned U.S. Pat. No. 7,525,933.

If the message is to be retransmitted (step 126), at step 128 a digital signature, or the like, may be generated from the message, portion, and/or portions thereof, and applied to the message. The response message can, optionally, be encrypted at step 128. The message is retransmitted at step 130. Therefrom, the process proceeds to step 106 and proceeds as previously described. If, at step 126, it is determined that the message is not to be retransmitted, the message is discarded at step 127.

If it is determined, at step 122, that a response is to be generated, a response is generated (as described above) at step 124. From step 124, the process proceeds to step 132 wherein the message path is extracted from the received media message. Thus, in an example embodiment, a list of all previous devices in the path is obtained from the media message. The message path is reversed at step 134, and the response is sent using the reversed message path. Thus, in an example embodiment, the current device can transmit a source-routed response using the reverse message path as the source route.

Figure 8:
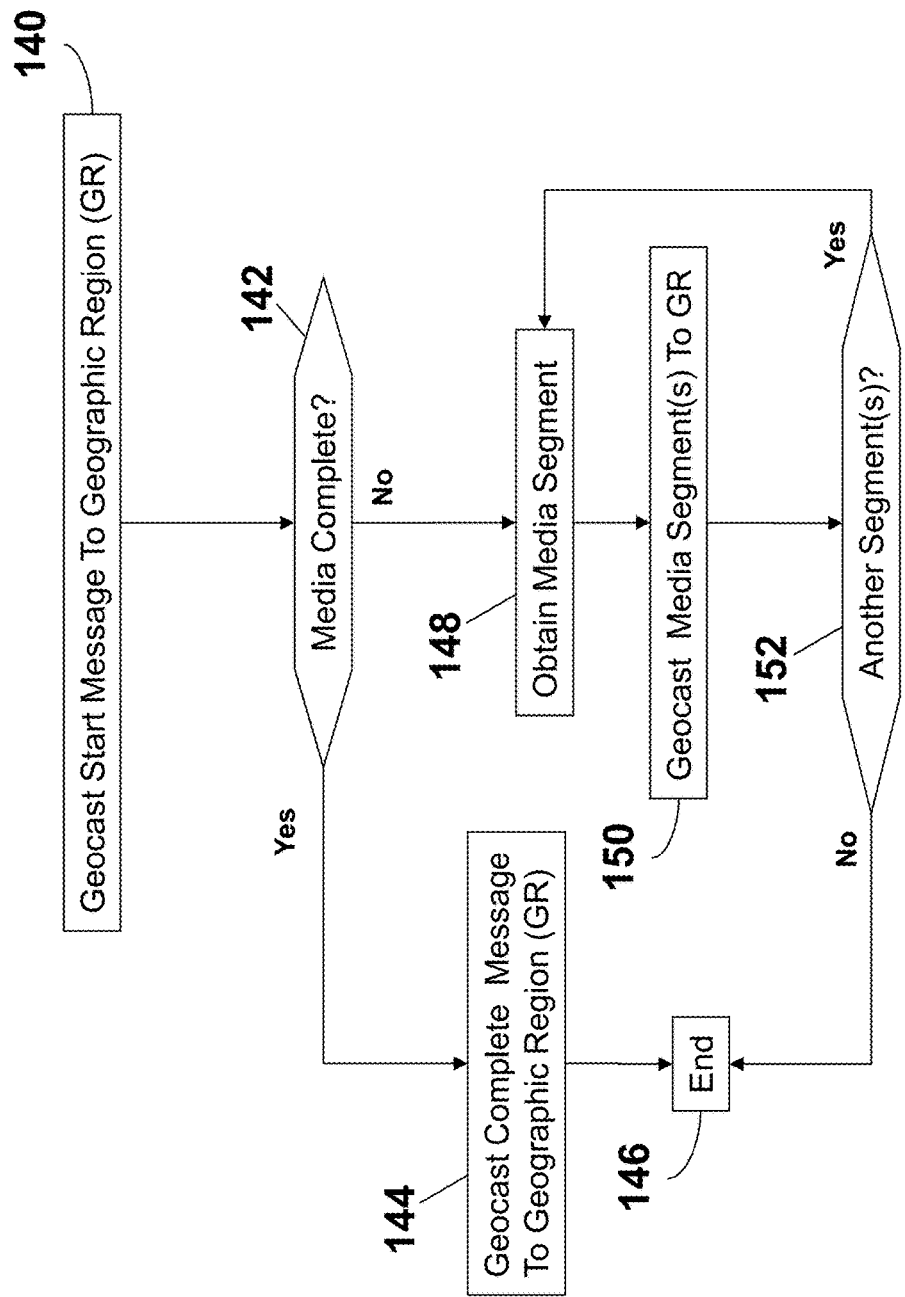
FIG. 8 is a flow diagram of another example process for distributing media via an ad hoc geocast protocol.

FIG. 8 is a flow diagram of another example process for distributing media via an ad hoc geocast protocol. At step 140, a start message can be sent to a target geographic region (GR). The start message can indicate that media is to be geocast to the geographic region. At step 142, it can be determined of the media is complete. If it is determined, at step 142, that the media is complete, the complete media message can be geocast to the geographic region at step 144. Therefrom, the process can end at step 146.

If, at step 142, it is determined that the media is not complete, a segment of the media can be obtained at step 148. A segment can comprise any appropriate portion of the media. In an example embodiment, multiple segments of media may be obtained at step 148. At step 150, the obtained segment, or segments, can be geocast to the geographic region (GR). At step 152, it can be determined if another segment or segments of media are to be geocast. If it is determined, at step 152, that another segment, or segments, of media is/are to be geocast to the geographic region, the process can proceed to step 148 and continue therefrom. If it is determined, at step 152, that another segment, or segments, of media is/are not to be geocast to the geographic region, the process can end at step 146.

Figure 9:
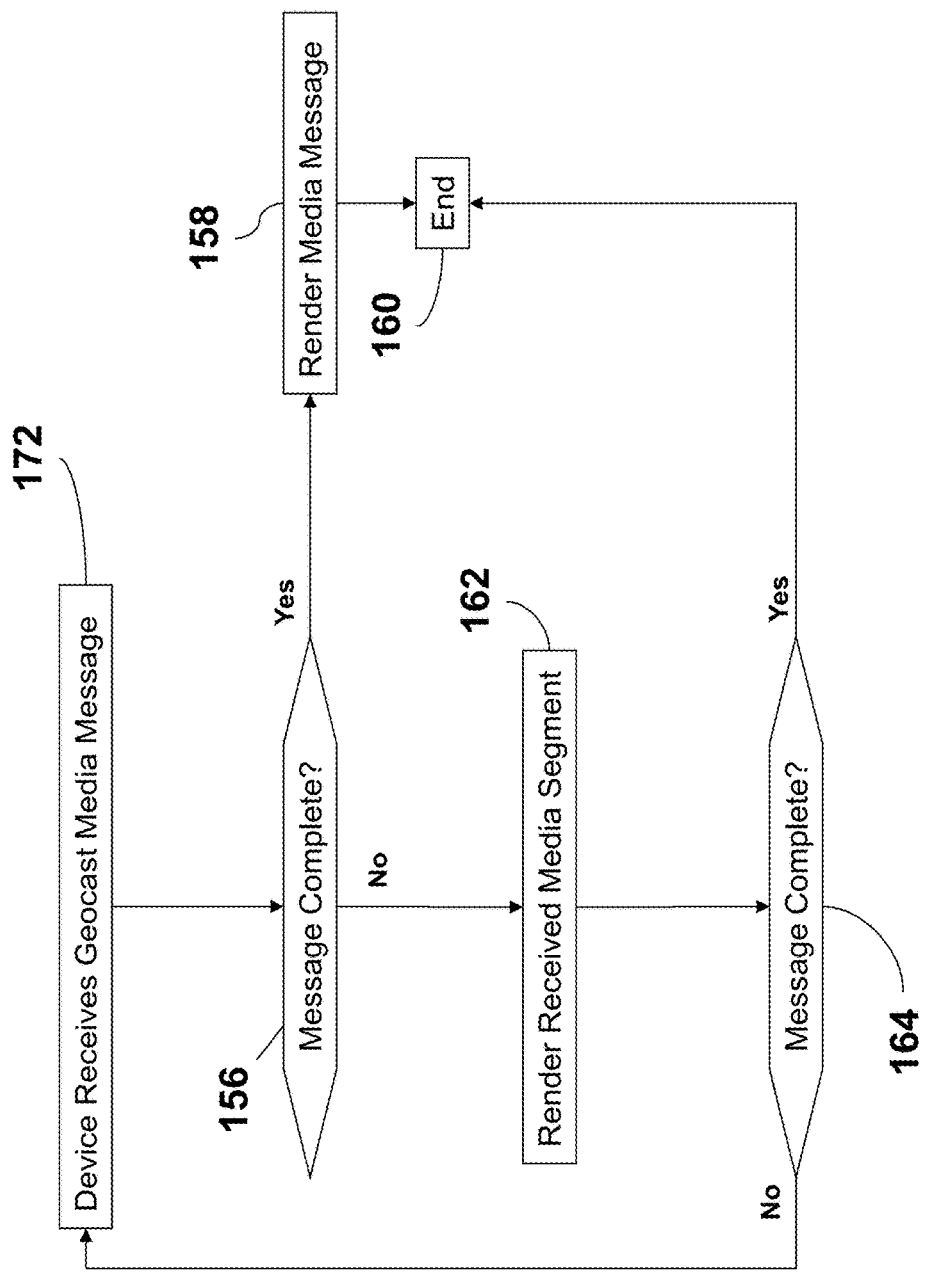
FIG. 9 is a flow diagram of another example process for distributing media via an ad hoc geocast protocol.

FIG. 9 is a flow diagram of another example process for distributing media via an ad hoc geocast protocol. It can be determined, at step 156, if the received media message is complete. If it is determined, at step 156, that the media message is complete, the received complete media message can be rendered at step 158. And, the process can end at step 160. If it is determined, at step 156, that the media message is not complete, the received segment of the media message can be rendered at step 162. It can be determined, at step 164, if, the message is complete. For example, it can be determined if the most recently received media segment was the final segment. If it is determined, at step 164, that the media message is complete, the process can end at step 160.

If it is determined, at step 164, that the media message is not complete, the process can proceed to step 154 to wait for the next media message segment.

Figure 10:
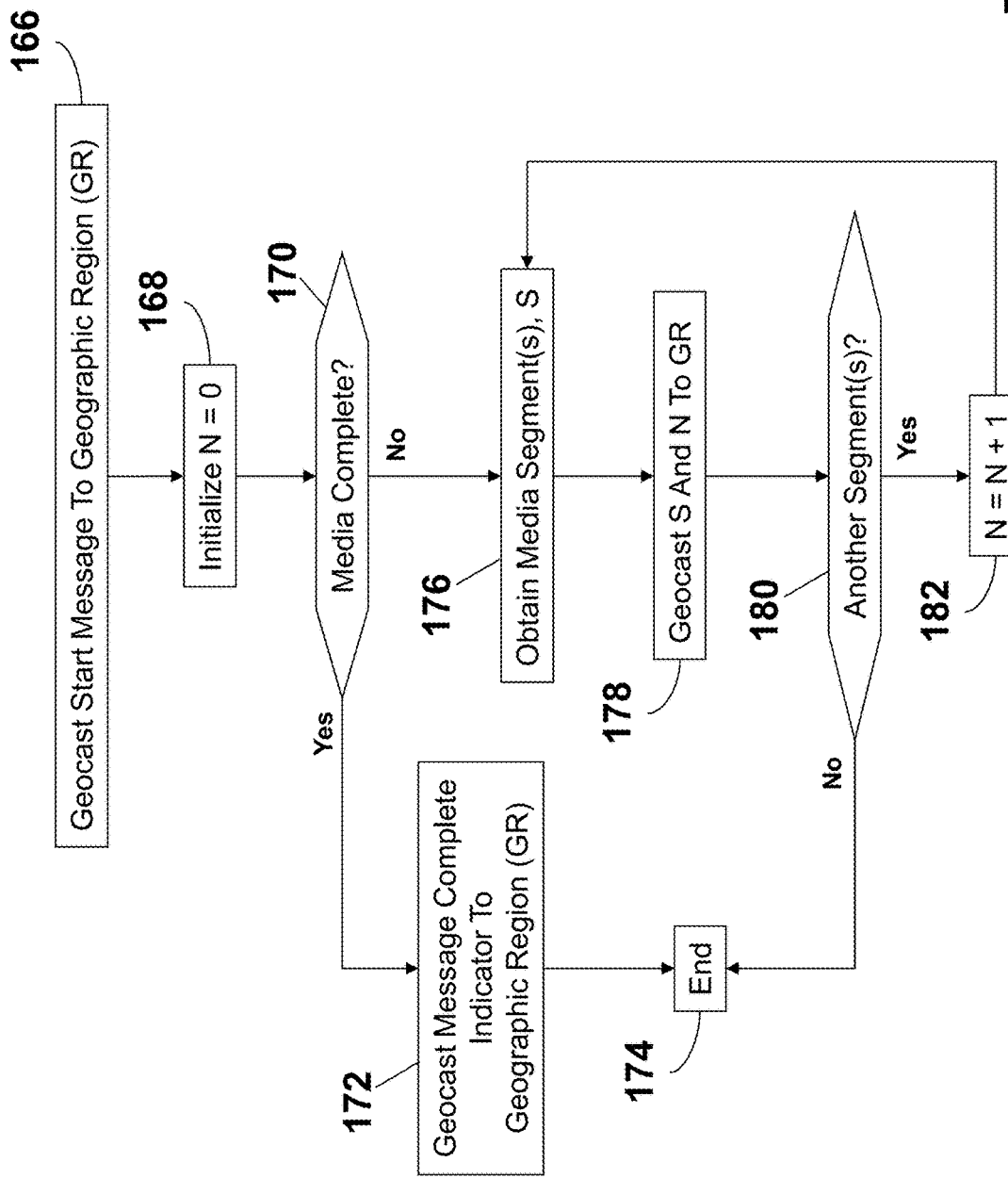
FIG. 10 is a flow diagram of an example process for distributing media via an ad hoc geocast protocol utilizing segment numbers.

FIG. 10 is a flow diagram of an example process for distributing media via an ad hoc geocast protocol utilizing segment numbers. In an example embodiment, segment numbers can be utilized to distribute media. For example, each segment, S, of media can be assigned a segment number, N. In an example embodiment, N is a positive integer, and values of N are assigned to the media segments, S, in monotonically increasing order. And, a message can be geocast with an indication of respective values of S and N for each segment of media in the message. At step 166, a start message can be sent to a target geographic region (GR). The start message can indicate that media is to be geocast to the geographic region. A segment number, N, can be set to zero at step 168. At step 170, it can be determined of the media is complete. If it is determined, at step 170, that the media is complete, the "message complete" indicator can be geocast to the geographic region at step 172. Therefrom, the process can end at step 174.

If, at step 170, it is determined that the media is not complete, a segment, S, of the media can be obtained at step 176. A segment, S, can comprise any appropriate portion of the media. In an example embodiment, multiple segments of media may be obtained at step 176. At step 166, the obtained segment, or segments, and the respective values of N, can be geocast to the geographic region (GR). At step 180, it can be determined if another segment or segments of media are to be geocast. If it is determined, at step 180, that another segment, or segments, of media is/are to be geocast to the geographic region, the current value of the segment number, N, can be incremented by 1 at step 182, and the process can proceed to step 164 and continue therefrom. If it is determined, at step 180, that another segment, or segments, of media is/are not to be geocast to the geographic region, the process can end at step 174.

Figure 11:
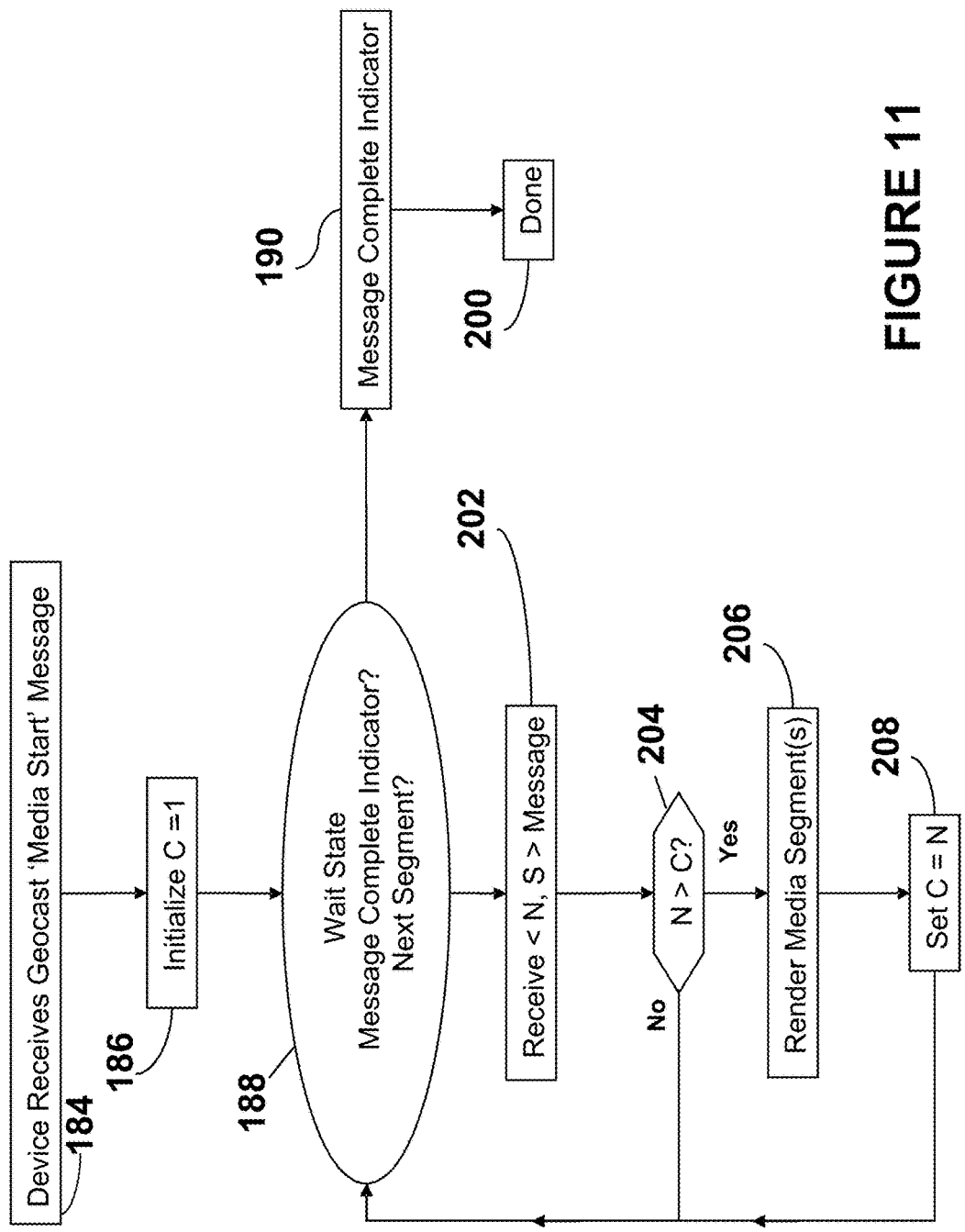
FIG. 11 is a flow diagram of an example implementation of the process depicted in FIG. 10.

FIG. 11 is a flow diagram of an example implementation of the process depicted in FIG. 10. A device can receive a geocast 'media start' message at step 184. The media start message can indicate that media is to be geocast to the geographic region in which the device resides. In an example embodiment, a message can include a media segment number(s), N, and the corresponding media data segment(s), S as described above. A variable, C, can be initialized at step 186. In an example embodiment, the variable, C, can represent the most recently received sequence number. In an example embodiment, C can be initialized, at step 186, to the value of negative one (−1). Because it is assumed, in this example embodiment, that a value of N is positive (as described above), a negative value of C can indicate that no media segment have been received. Note that in this example embodiment, C can be initialized to any appropriate non-positive value at step 186. The device can be in a wait state at step 188. In an example embodiment, during the wait state, the device can be waiting for an indication that the received message is complete or for another segment of media.

If an indication that a received message is complete is received during the wait state, 188, as depicted at step 190, the process can end at step 200. If a segment of media is received during the wait state, 188, as depicted at step 202, the message can comprise the segment number(s), N, and corresponding media data segment(s), S. The value of C, the value of the most recently received sequence number, is compared with the value of N at step 204. If the value of N is not greater than the value of C, as determined at step 304, the process proceeds to step 188 and continues therefrom. If the value of N is not greater than the value of C, as determined at step 304, this can be an indication that a message segment has not yet been received. And, that message segment can be ignored. If the value of N is greater than the value of C, as determined at step 304, the media segment, or segments, can be rendered at step 206. The value of C is set to the current value of N at step 208, and the process proceeds to step 188 and continues therefrom. The effect of the process depicted in FIG. 11 is that gaps in the received media stream can be ignored, rather than waiting for all missing gaps to be received before rendering the media. For example, validity can be determined by determining where in a sequence of media segments a particular segment lies (is positioned). As another example, validity can be determined by a particular segment is later in the sequence than all previously received segments. Thus, media could be received in a plurality of message segments via a plurality of messages. If a media segment is determined to be valid, the media segment can be rendered. If a media segment is determined to be invalid, the invalid media message is skipped and a subsequent message can be processed. This could be useful in situations in which real time voice is being distributed.

Figure 12:
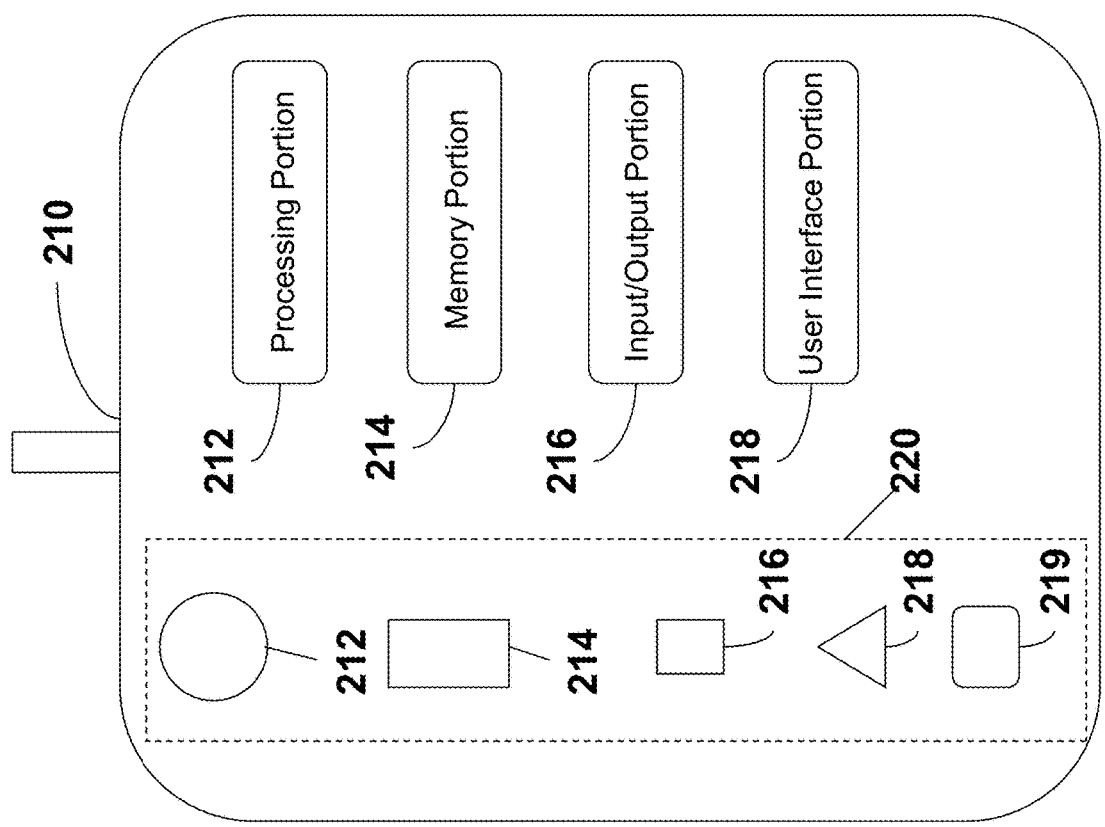
FIG. 12 is a block diagram of an example wireless communications device that is configurable to facilitate distribution of media via an ad hoc geocast protocol.

FIG. 12 is a block diagram of an example wireless communications device that is configurable to facilitate distribution of media via an ad hoc geocast protocol. The mobile device 210 can include any appropriate device, mechanism, software, and/or hardware for facilitating distribution of media via an ad hoc geographic routing/broadcast (geocast) protocol as described herein. As described herein, the mobile device 210 comprises hardware, or a combination of hardware and software. And, each portion of the mobile device 210 comprises hardware, or a combination of hardware and software. Each portion of the mobile device 210, described herein, comprises circuitry for performing functions associated with the respective portion. In an example configuration, the mobile device 210 can comprise a processing portion 212, a memory portion 214, an input/output portion 216, a user interface (UI) portion 218, and a sensor portion 221 comprising at least one of a video camera portion 222, a force/wave sensor 224, a microphone 226, a moisture sensor 228, a compass, 230, or a combination thereof. The force/wave sensor 224 can comprise at least one of a motion detector, an accelerometer, an acoustic sensor, a tilt sensor, a pressure sensor, a temperature sensor, or the like. The motion detector can be configured to detect motion occurring outside of the communications device, for example via disturbance of a standing wave, via electromagnetic and/or acoustic energy, or the like. The accelerator is capable of sensing acceleration, motion, and/or movement of the communications device. The acoustic sensor is capable of sensing acoustic energy, such as a noise, voice, etc., for example. The tilt sensor is capable of detecting a tilt of the communications device. The pressure sensor is capable of sensing pressure against the communications device, such as from a shock wave caused by broken glass or the like. The temperature sensor is capable of sensing a measuring temperature, such as inside of the vehicle, room, building, or the like. The moisture sensor 228 is capable of detecting moisture, such as detecting if the mobile device 210 is submerged in a liquid. The processing portion 212, memory portion 214, input/output portion 216, user interface (UI) portion 218, video camera portion 222, force/wave sensor 224, and microphone 226 are coupled together to allow communications therebetween (coupling not shown in FIG. 12). The mobile device 210 also can comprise a timer (not depicted in FIG. 12).

In various embodiments, the input/output portion 216 comprises a receiver of the mobile device 210, a transmitter of the mobile device 210, or a combination thereof. The input/output portion 216 is capable of, in conjunction with any other portion of the mobile device 210 as needed, receiving and/or providing information pertaining to distribution of media via an ad hoc geographic routing/broadcast (geocast) protocol as described herein. The input/output portion 216 also is capable of communications with other devices/sensors, as described herein. For example, the input/output portion 216 can include a wireless communications (e.g., 2.5G/3G/4G) SIM card. The input/output portion 216 is capable of receiving and/or sending text information, video information, audio information, control information, image information, data, or any combination thereof. In an example embodiment, the input/output portion 216 is capable of receiving and/or sending information to determine a location of the mobile device 210. In an example configuration, the input\output portion 216 comprises a GPS receiver. In an example configuration, the mobile device 210 can determine its own geographical location through any type of location determination system including, for example, the Global Positioning System (GPS), assisted GPS (A-GPS), time difference of arrival calculations, configured constant location (in the case of non-moving devices), any combination thereof, or any other appropriate means. In various configurations, the input/output portion 216 can receive and/or provide information via any appropriate means, such as, for example, optical means (e.g., infrared), electromagnetic means (e.g., RF, WI-FI, BLUETOOTH, ZIGBEE, etc.), acoustic means (e.g., speaker, microphone, ultrasonic receiver, ultrasonic transmitter), or a combination thereof. In an example configuration, the input/output portion comprises a WIFI finder, a two way GPS chipset or equivalent, or the like.

The processing portion 212 is capable of facilitating distribution of media via an ad hoc geographic routing/broadcast (geocast) protocol, as described herein. The processing portion 212, in conjunction with any other portion of the mobile device 210, can provide the ability for users/subscribers to enable, disable, and configure various features of an application for facilitating distribution of media via an ad hoc geographic routing/broadcast (geocast) protocol, as described herein. The processing portion 212, in conjunction with any other portion of the mobile device 210 as needed, can enable the mobile device 210 to covert speech to text when it is configured to send text messages. In an example embodiment, the processing portion 212, in conjunction with any other portion of the mobile device 210 as needed, can convert text to speech for rendering via the user interface portion 218.

In a basic configuration, the mobile device 210 can include at least one memory portion 214. The memory portion 214 can store any information utilized in conjunction with facilitating distribution of media via an ad hoc geographic routing/broadcast (geocast) protocol, as described herein. Depending upon the exact configuration and type of processor, the memory portion 214 can be volatile (such as some types of RAM), non-volatile (such as ROM, flash memory, for example). The mobile device 210 can include additional storage (e.g., removable storage and/or non-removable storage) including, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or the like. In an example configuration, the memory portion 214, or a portion of the memory portion 212 is hardened such that information stored therein can be recovered if the mobile device 210 is exposed to extreme heat, extreme vibration, extreme moisture, corrosive chemicals or gas, or the like. In an example configuration, the information stored in the hardened portion of the memory portion 214 is encrypted, or otherwise rendered unintelligible without use of an appropriate cryptographic key, password, biometric (voiceprint, fingerprint, retinal image, facial image, or the like). Wherein, use of the appropriate cryptographic key, password, biometric will render the information stored in the hardened portion of the memory portion 214 intelligible.

The mobile device 210 also can contain a UI portion 218 allowing a user to communicate with the mobile device 210. The UI portion 218 is capable of rendering any information utilized in conjunction with the mobile device 210 to facilitate distribution of media via an ad hoc geographic routing/broadcast (geocast) protocol, as described herein. For example, the UI portion 218 can provide means for entering text, entering a phone number, rendering text, rendering images, rendering multimedia, rendering sound, rendering video, receiving sound, rendering mechanical vibration, or the like, as described herein. The UI portion 218 can provide the ability to control the mobile device 210, via, for example, buttons, soft keys, voice actuated controls, a touch screen, movement of the mobile device 210, visual cues (e.g., moving a hand or finger in front of a camera on the mobile device 210), or the like. The UI portion 218 can provide visual information (e.g., via a display), audio information (e.g., via speaker), mechanically (e.g., via a vibrating mechanism), or a combination thereof. In various configurations, the UI portion 218 can comprise a display, a touch screen, a keyboard, a speaker, or any combination thereof. The UI portion 218 can comprise means for inputting biometric information, such as, for example, fingerprint information, retinal information, voice information, and/or facial characteristic information. The UI portion 218 can be utilized to enter an indication of the designated destination (e.g., the phone number, IP address, geographic information, or the like).

In an example embodiment, the sensor portion 221 of the mobile device 210 comprises the video camera portion 222, the force/wave sensor 224, and the microphone 226. The video camera portion 222 comprises a camera (or cameras) and associated equipment capable of capturing still images and/or video and to provide the captured still images and/or video to other portions of the mobile device 210. In an example embodiment, the force/wave sensor 224 comprises an accelerometer, a tilt sensor, an acoustic sensor capable of sensing acoustic energy, an optical sensor (e.g., infrared), or any combination thereof.

Although not necessary to implement the mobile device 210 to facilitate distribution of media via an ad hoc geographic routing/broadcast (geocast) protocol, a communications device can be part of and/or in communications with various wireless communications networks. Some of which are described below.

Figure 13:
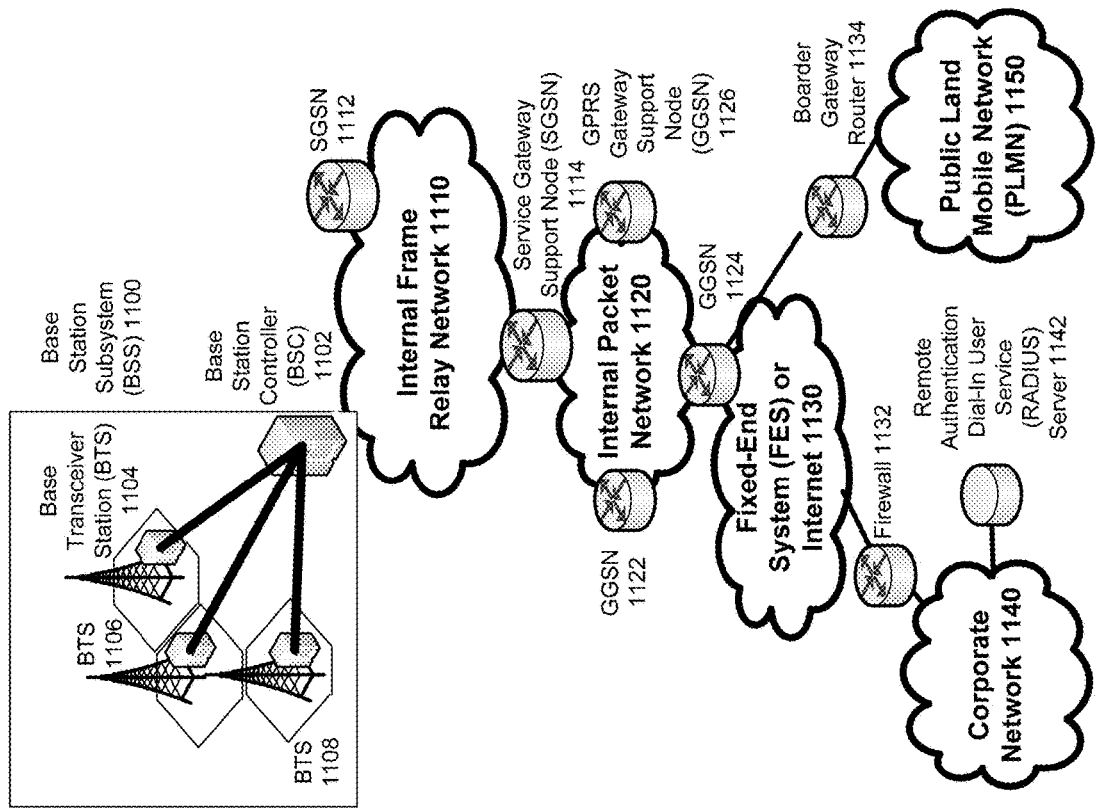
FIG. 13 illustrates an architecture of a typical GPRS network within which a mobile device configured to facilitate distribution of media via a geocast protocol can be implemented.

FIG. 13 depicts an overall block diagram of an exemplary packet-based mobile cellular network environment, such as a GPRS network, within which distribution of media via an ad hoc geographic routing/broadcast (geocast) protocol can be implemented. In the exemplary packet-based mobile cellular network environment shown in FIG. 13, there are a plurality of Base Station Subsystems ("BSS") 1100 (only one is shown), each of which comprises a Base Station Controller ("BSC") 1102 serving a plurality of Base Transceiver Stations ("BTS") such as BTSs 1104, 1106, and 1108. BTSs 1104, 1106, 1108, etc. are the access points where users of packet-based mobile devices become connected to the wireless network. In exemplary fashion, the packet traffic originating from user devices is transported via an over-the-air interface to a BTS 1108, and from the BTS 1108 to the BSC 1102. Base station subsystems, such as BSS 1100, are a part of internal frame relay network 1110 that can include Service GPRS Support Nodes ("SGSN") such as SGSN 1112 and 1114. Each SGSN is connected to an internal packet network 1120 through which a SGSN 1112, 1114, etc. can route data packets to and from a plurality of gateway GPRS support nodes (GGSN) 1122, 1124, 1126, etc. As illustrated, SGSN 1114 and GGSNs 1122, 1124, and 1126 are part of internal packet network 1120. Gateway GPRS serving nodes 1122, 1124 and 1126 mainly provide an interface to external Internet Protocol ("IP") networks such as Public Land Mobile Network ("PLMN") 1150, corporate intranets 1140, or Fixed-End System ("FES") or the public Internet 1130. As illustrated, subscriber corporate network 1140 may be connected to GGSN 1124 via firewall 1132; and PLMN 1150 is connected to GGSN 1124 via boarder gateway router 1134. The Remote Authentication Dial-In User Service ("RADIUS") server 1142 may be used for caller authentication when a user of a mobile cellular device calls corporate network 1140.

Generally, there can be a several cell sizes in a GSM network, referred to as macro, micro, pico, femto and umbrella cells. The coverage area of each cell is different in different environments. Macro cells can be regarded as cells in which the base station antenna is installed in a mast or a building above average rooftop level. Micro cells are cells whose antenna height is under average roof top level. Micro-cells are typically used in urban areas. Pico cells are small cells having a diameter of a few dozen meters. Pico cells are used mainly indoors. Femto cells have the same size as pico cells, but a smaller transport capacity. Femto cells are used indoors, in residential, or small business environments. On the other hand, umbrella cells are used to cover shadowed regions of smaller cells and fill in gaps in coverage between those cells.

Figure 14:
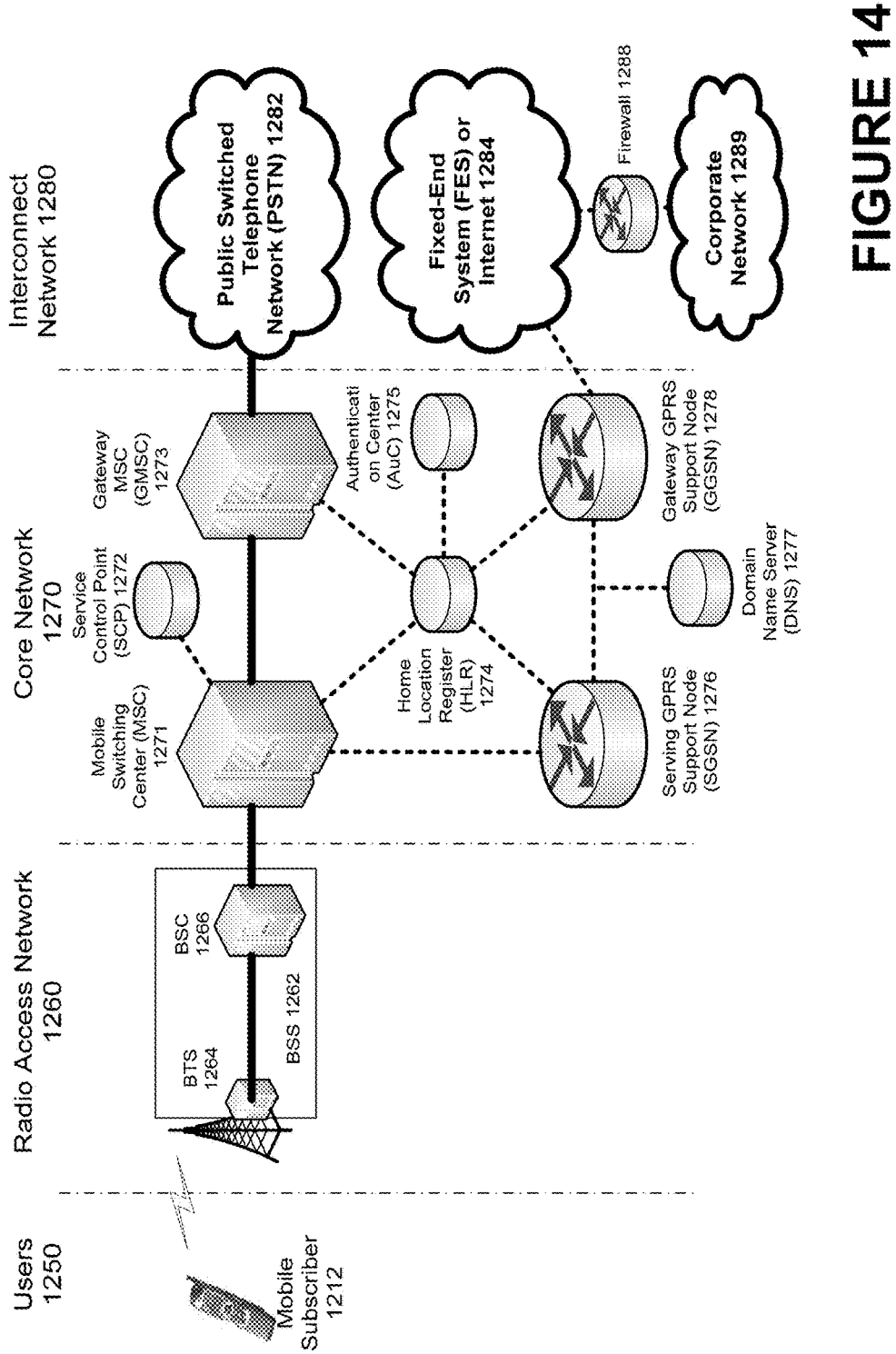
FIG. 14 illustrates an exemplary block diagram view of a GSM/GPRS/IP multimedia network architecture within which a mobile device configured to facilitate distribution of media via a geocast protocol can be implemented.

FIG. 14 illustrates an architecture of a typical GPRS network within which a mobile device configured to facilitate distribution of media via an ad hoc geographic routing/broadcast (geocast) protocol can be implemented. The architecture depicted in FIG. 14 is segmented into four groups: users 1250, radio access network 1260, core network 1270, and interconnect network 1280. Users 1250 comprise a plurality of end users. Note, device 1212 is referred to as a mobile subscriber in the description of network shown in FIG. 14. In an example embodiment, the device depicted as mobile subscriber 1212 comprises a communications device (e.g., device/sensor 70). Radio access network 1260 comprises a plurality of base station subsystems such as BSSs 1262, which include BTSs 1264 and BSCs 1266. Core network 1270 comprises a host of various network elements. As illustrated in FIG. 14, core network 1270 may comprise Mobile Switching Center ("MSC") 1271, Service Control Point ("SCP") 1272, gateway MSC 1273, SGSN 1276, Home Location Register ("HLR") 1274, Authentication Center ("AuC") 1275, Domain Name Server ("DNS") 1277, and GGSN 1278. Interconnect network 1280 also comprises a host of various networks and other network elements. As illustrated in FIG. 14, interconnect network 1280 comprises Public Switched Telephone Network ("PSTN") 1282. Fixed-End System ("FES") or Internet 1284, firewall 1288, and Corporate Network 1289.

A mobile switching center can be connected to a large number of base station controllers. At MSC 1271, for instance, depending on the type of traffic, the traffic may be separated in that voice may be sent to Public Switched Telephone Network ("PSTN") 1282 through Gateway MSC ("GMSC") 1273, and/or data may be sent to SGSN 1276, which then sends the data traffic to GGSN 1278 for further forwarding.

When MSC 1271 receives call traffic, for example, from BSC 1266, it sends a query to a database hosted by SCP 1272. The SCP 1272 processes the request and issues a response to MSC 1271 so that it may continue call processing as appropriate.

The HLR 1274 is a centralized database for users to register to the GPRS network. HLR 1274 stores static information about the subscribers such as the International Mobile Subscriber Identity ("IMSI"), subscribed services, and a key for authenticating the subscriber. HLR 1274 also stores dynamic subscriber information such as the current location of the mobile subscriber. Associated with HLR 1274 is AuC 1275. AuC 1275 is a database that contains the algorithms for authenticating subscribers and includes the associated keys for encryption to safeguard the user input for authentication.

In the following, depending on context, the term "mobile subscriber" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 14, when mobile subscriber 1212 initiates the attach process by turning on the network capabilities of the mobile device, an attach request is sent by mobile subscriber 1212 to SGSN 1276. The SGSN 1276 queries another SGSN, to which mobile subscriber 1212 was attached before, for the identity of mobile subscriber 1212. Upon receiving the identity of mobile subscriber 1212 from the other SGSN, SGSN 1276 requests more information from mobile subscriber 1212. This information is used to authenticate mobile subscriber 1212 to SGSN 1276 by HLR 1274. Once verified, SGSN 1276 sends a location update to HLR 1274 indicating the change of location to a new SGSN, in this case SGSN 1276. HLR 1274 notifies the old SGSN, to which mobile subscriber 1212 was attached before, to cancel the location process for mobile subscriber 1212. HLR 1274 then notifies SGSN 1276 that the location update has been performed. At this time, SGSN 1276 sends an Attach Accept message to mobile subscriber 1212, which in turn sends an Attach Complete message to SGSN 1276.

After attaching itself with the network, mobile subscriber 1212 then goes through the authentication process. In the authentication process, SGSN 1276 sends the authentication information to HLR 1274, which sends information back to SGSN 1276 based on the user profile that was part of the user's initial setup. The SGSN 1276 then sends a request for authentication and ciphering to mobile subscriber 1212. The mobile subscriber 1212 uses an algorithm to send the user identification (ID) and password to SGSN 1276. The SGSN 1276 uses the same algorithm and compares the result. If a match occurs, SGSN 1276 authenticates mobile subscriber 1212.

Next, the mobile subscriber 1212 establishes a user session with the destination network, corporate network 1289, by going through a Packet Data Protocol ("PDP") activation process. Briefly, in the process, mobile subscriber 1212 requests access to the Access Point Name ("APN"), for example, UPS.com, and SGSN 1276 receives the activation request from mobile subscriber 1212. SGSN 1276 then initiates a Domain Name Service ("DNS") query to learn which GGSN node has access to the UPS.com APN. The DNS query is sent to the DNS server within the core network 1270, such as DNS 1277, which is provisioned to map to one or more GGSN nodes in the core network 1270. Based on the APN, the mapped GGSN 1278 can access the requested corporate network 1289. The SGSN 1276 then sends to GGSN 1278 a Create Packet Data Protocol ("PDP") Context Request message that contains necessary information. The GGSN 1278 sends a Create PDP Context Response message to SGSN 1276, which then sends an Activate PDP Context Accept message to mobile subscriber 1212.

Once activated, data packets of the call made by mobile subscriber 1212 can then go through radio access network 1260, core network 1270, and interconnect network 1280, in a particular fixed-end system or Internet 1284 and firewall 1288, to reach corporate network 1289.

Figure 15:
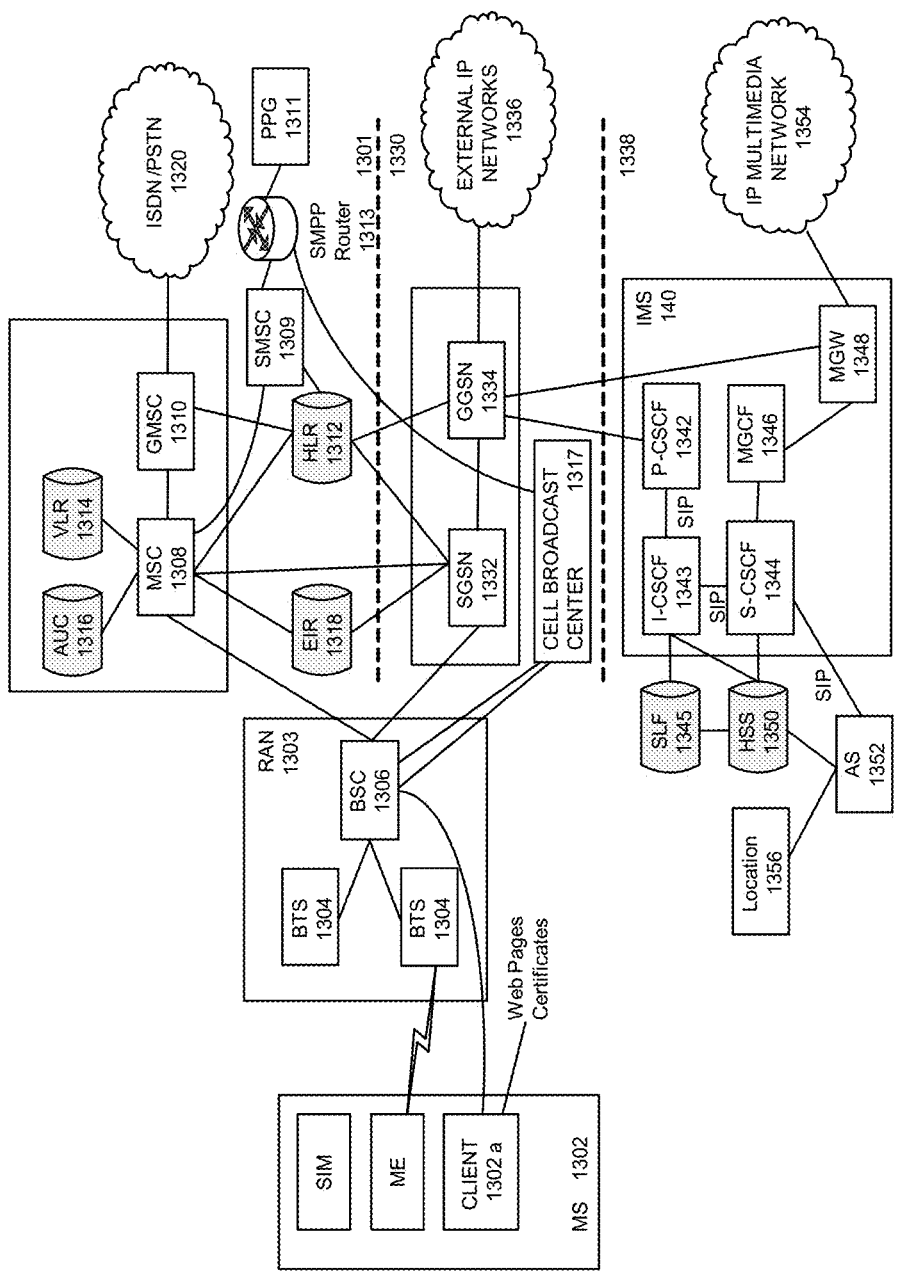
FIG. 15 illustrates a PLMN block diagram view of an exemplary architecture in which a mobile device configured to facilitate distribution of media via a geocast protocol may be incorporated.

FIG. 15 illustrates an exemplary block diagram view of a GSM/GPRS/IP multimedia network architecture within which a mobile device configured to facilitate distribution of media via an ad hoc geographic routing/broadcast (geocast) protocol can be implemented. As illustrated, the architecture of FIG. 15 includes a GSM core network 1301, a GPRS network 1330 and an IP multimedia network 1338. The GSM core network 1301 includes a Mobile Station (MS) 1302, at least one Base Transceiver Station (BTS) 1304 and a Base Station Controller (BSC) 1306. The MS 1302 is physical equipment or Mobile Equipment (ME), such as a mobile phone or a laptop computer that is used by mobile subscribers, with a Subscriber identity Module (SIM) or a Universal Integrated Circuit Card (UICC). The SIM or UICC includes an International Mobile Subscriber Identity (IMSI), which is a unique identifier of a subscriber. The BTS 1304 is physical equipment, such as a radio tower, that enables a radio interface to communicate with the MS. Each BTS may serve more than one MS. The BSC 1306 manages radio resources, including the BTS. The BSC may be connected to several BTSs. The BSC and BTS components, in combination, are generally referred to as a base station (BSS) or radio access network (RAN) 1303.

The GSM core network 1301 also includes a Mobile Switching Center (MSC) 1308, a Gateway Mobile Switching Center (GMSC) 1310, a Home Location Register (HLR) 1312, Visitor Location Register (VLR) 1314, an Authentication Center (AuC) 1318, and an Equipment Identity Register (EIR) 1316. The MSC 1308 performs a switching function for the network. The MSC also performs other functions, such as registration, authentication, location updating, handovers, and call routing. The GMSC 1310 provides a gateway between the GSM network and other networks, such as an Integrated Services Digital Network (ISDN) or Public Switched Telephone Networks (PSTNs) 1320. Thus, the GMSC 1310 provides interworking functionality with external networks.

The HLR 1312 is a database that contains administrative information regarding each subscriber registered in a corresponding GSM network. The HLR 1312 also contains the current location of each MS. The VLR 1314 is a database that contains selected administrative information from the HLR 1312. The VLR contains information necessary for call control and provision of subscribed services for each MS currently located in a geographical area controlled by the VLR. The HLR 1312 and the VLR 1314, together with the MSC 1308, provide the call routing and roaming capabilities of GSM. The AuC 1316 provides the parameters needed for authentication and encryption functions. Such parameters allow verification of a subscriber's identity. The EIR 1318 stores security-sensitive information about the mobile equipment.

A Short Message Service Center (SMSC) 1309 allows one-to-one Short Message Service (SMS) messages to be sent to/from the MS 1302. A Push Proxy Gateway (PPG) 1311 is used to "push" (i.e., send without a synchronous request) content to the MS 1302. The PPG 1311 acts as a proxy between wired and wireless networks to facilitate pushing of data to the MS 1302. A Short Message Peer to Peer (SMPP) protocol router 1313 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 1302 sends a location update including its current location information to the MSC/VLR, via the BTS 1304 and the BSC 1306. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 1330 is logically implemented on the GSM core network architecture by introducing two packet-switching network nodes, a serving GPRS support node (SGSN) 1332, a cell broadcast and a Gateway GPRS support node (GGSN) 1334. The SGSN 1332 is at the same hierarchical level as the MSC 1308 in the GSM network. The SGSN controls the connection between the GPRS network and the MS 1302. The SGSN also keeps track of individual MS's locations and security functions and access controls.

A Cell Broadcast Center (CBC) 1317 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 1334 provides a gateway between the GPRS network and a public packet network (PDN) or other IP networks 1336. That is, the GGSN provides interworking functionality with external networks, and sets up a logical link to the MS through the SGSN. When packet-switched data leaves the GPRS network, it is transferred to an external TCP-IP network 1336, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one of three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 1330 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how to signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not receive pages from a circuit switched domain when engaged in a data call, since the MS is receiving data and is not listening to a paging channel. In a NOM3 network, a MS can monitor pages for a circuit switched network while received data and vice versa.

The IP multimedia network 1338 was introduced with 3GPP Release 5, and includes an IP multimedia subsystem (IMS) 1340 to provide rich multimedia services to end users. A representative set of the network entities within the IMS 1340 are a call/session control function (CSCF), a media gateway control function (MGCF) 1346, a media gateway (MGW) 1348, and a master subscriber database, called a home subscriber server (HSS) 1350. The HSS 1350 may be common to the GSM network 1301, the GPRS network 1330 as well as the IP multimedia network 1338.

The IP multimedia system 1340 is built around the call/session control function, of which there are three types: an interrogating CSCF (I-CSCF) 1343, a proxy CSCF (P-CSCF) 1342, and a serving CSCF (S-CSCF) 1344. The P-CSCF 1342 is the MS's first point of contact with the IMS 1340. The P-CSCF 1342 forwards session initiation protocol (SIP) messages received from the MS to an SIP server in a home network (and vice versa) of the MS. The P-CSCF 1342 may also modify an outgoing request according to a set of rules defined by the network operator (for example, address analysis and potential modification).

The I-CSCF 1343, forms an entrance to a home network and hides the inner topology of the home network from other networks and provides flexibility for selecting an S-CSCF. The I-CSCF 1343 may contact a subscriber location function (SLF) 1345 to determine which HSS 1350 to use for the particular subscriber, if multiple HSS's 1350 are present. The S-CSCF 1344 performs the session control services for the MS 1302. This includes routing originating sessions to external networks and routing terminating sessions to visited networks. The S-CSCF 1344 also decides whether an application server (AS) 1352 is required to receive information on an incoming SIP session request to ensure appropriate service handling. This decision is based on information received from the HSS 1350 (or other sources, such as an application server 1352). The AS 1352 also communicates to a location server 1356 (e.g., a Gateway Mobile Location Center (GMLC)) that provides a position (e.g., latitude/longitude coordinates) of the MS 1302.

The HSS 1350 contains a subscriber profile and keeps track of which core network node is currently handling the subscriber. It also supports subscriber authentication and authorization functions (AAA). In networks with more than one HSS 1350, a subscriber location function provides information on the HSS 1350 that contains the profile of a given subscriber.

The MGCF 1346 provides interworking functionality between SIP session control signaling from the IMS 1340 and ISUP/BICC call control signaling from the external GSTN networks (not shown). It also controls the media gateway (MGW) 1348 that provides user-plane interworking functionality (e.g., converting between AMR- and PCM-coded voice). The MGW 1348 also communicates with other IP multimedia networks 1354.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

Figure 16:
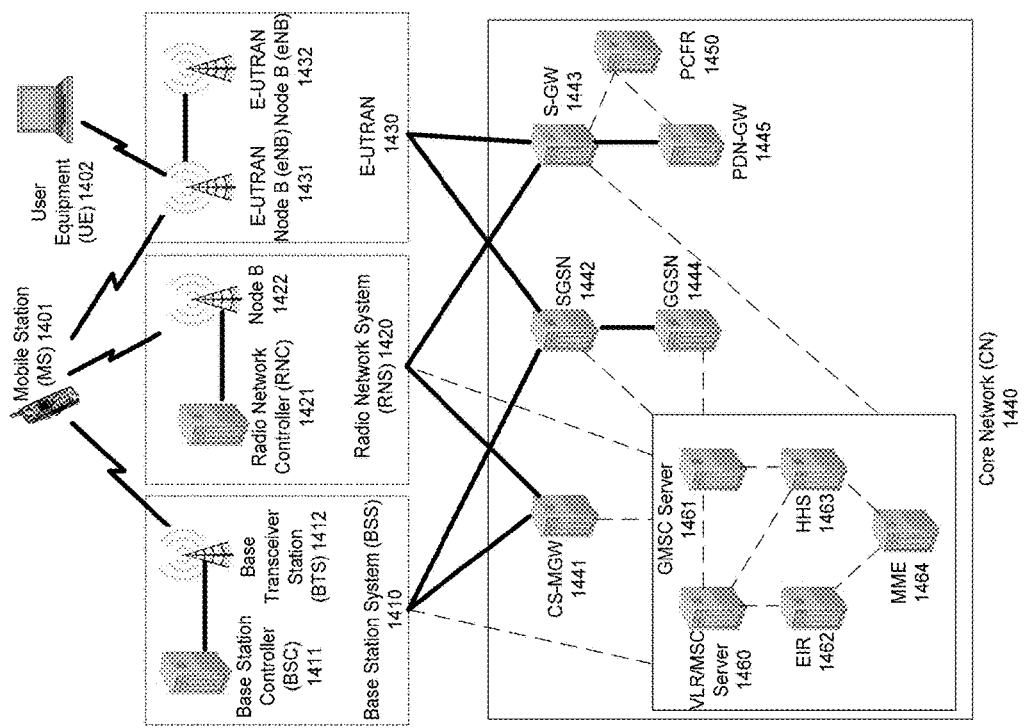
FIG. 16 illustrates a PLMN block diagram view of an exemplary architecture in which a mobile device configured to facilitate distribution of media via an ad hoc geographic routing/broadcast (geocast) protocol may be incorporated.

FIG. 16 illustrates a PLMN block diagram view of an exemplary architecture in which a mobile device configured to facilitate distribution of media via an ad hoc geographic routing/broadcast (geocast) protocol may be incorporated. Mobile Station (MS) 1401 is the physical equipment used by the PLMN subscriber. In one illustrative embodiment, communications device 200 may serve as Mobile Station 1401. Mobile Station 1401 may be one of, but not limited to, a cellular telephone, a cellular telephone in combination with another electronic device or any other wireless mobile communication device.

Mobile Station 1401 may communicate wirelessly with Base Station System (BSS) 1410. BSS 1410 contains a Base Station Controller (BSC) 1411 and a Base Transceiver Station (BTS) 1412. BSS 1410 may include a single BSC 1411/BTS 1412 pair (Base Station) or a system of BSC/BTS pairs which are part of a larger network. BSS 1410 is responsible for communicating with Mobile Station 1401 and may support one or more cells. BSS 1410 is responsible for handling cellular traffic and signaling between Mobile Station 1401 and Core Network 1440. Typically, BSS 1410 performs functions that include, but are not limited to, digital conversion of speech channels, allocation of channels to mobile devices, paging, and transmission/reception of cellular signals.

Additionally, Mobile Station 1401 may communicate wirelessly with Radio Network System (RNS) 1420. RNS 1420 contains a Radio Network Controller (RNC) 1421 and one or more Node(s) B 1422. RNS 1420 may support one or more cells. RNS 1420 may also include one or more RNC 1421/Node B 1422 pairs or alternatively a single RNC 1421 may manage multiple Nodes B 1422. RNS 1420 is responsible for communicating with Mobile Station 1401 in its geographically defined area. RNC 1421 is responsible for controlling the Node(s) B 1422 that are connected to it and is a control element in a UMTS radio access network. RNC 1421 performs functions such as, but not limited to, load control, packet scheduling, handover control, security functions, as well as controlling Mobile Station 1401's access to the Core Network (CN) 1440.

The evolved UMTS Terrestrial Radio Access Network (E-UTRAN) 1430 is a radio access network that provides wireless data communications for Mobile Station 1401 and User Equipment 1402. E-UTRAN 1430 provides higher data rates than traditional UMTS. It is part of the Long Term Evolution (LTE) upgrade for mobile networks and later releases meet the requirements of the International Mobile Telecommunications (IMT) Advanced and are commonly known as a 4G networks. E-UTRAN 1430 may include of series of logical network components such as E-UTRAN Node B (eNB) 1431 and E-UTRAN Node B (eNB) 1432. E-UTRAN 1430 may contain one or more eNBs. User Equipment 1402 may be any user device capable of connecting to E-UTRAN 1430 including, but not limited to, a personal computer, laptop, mobile device, wireless router, or other device capable of wireless connectivity to E-UTRAN 1430. The improved performance of the E-UTRAN 1430 relative to a typical UMTS network allows for increased bandwidth, spectral efficiency, and functionality including, but not limited to, voice, high-speed applications, large data transfer and IPTV, while still allowing for full mobility.

An exemplary embodiment of a mobile data and communication service that may be implemented in the PLMN architecture described in FIG. 16 is the Enhanced Data rates for GSM Evolution (EDGE). EDGE is an enhancement for GPRS networks that implements an improved signal modulation scheme known as 8-PSK (Phase Shift Keying). By increasing network utilization, EDGE may achieve up to three times faster data rates as compared to a typical GPRS network. EDGE may be implemented on any GSM network capable of hosting a GPRS network, making it an ideal upgrade over GPRS since it may provide increased functionality of existing network resources. Evolved EDGE networks are becoming standardized in later releases of the radio telecommunication standards, which provide for even greater efficiency and peak data rates of up to 1 Mbit/s, while still allowing implementation on existing GPRS-capable network infrastructure.

Typically Mobile Station 1401 may communicate with any or all of BSS 1410. RNS 1420, or E-UTRAN 1430. In a illustrative system, each of BSS 1410, RNS 1420, and E-UTRAN 1430 may provide Mobile Station 1401 with access to Core Network 1440. The Core Network 1440 may include of a series of devices that route data and communications between end users. Core Network 1440 may provide network service functions to users in the Circuit Switched (CS) domain, the Packet Switched (PS) domain or both. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The Circuit Switched—Media Gateway Function (CS-MGW) 1441 is part of Core Network 1440, and interacts with Visitor Location Register (VLR) and Mobile-Services Switching Center (MSC) Server 1460 and Gateway MSC Server 1461 in order to facilitate Core Network 1440 resource control in the CS domain. Functions of CS-MGW 1441 include, but are not limited to, media conversion, bearer control, payload processing and other mobile network processing such as handover or anchoring. CS-MGW 1440 may receive connections to Mobile Station 1401 through BSS 1410, RNS 1420 or both.

Serving GPRS Support Node (SGSN) 1442 stores subscriber data regarding Mobile Station 1401 in order to facilitate network functionality. SGSN 1442 may store subscription information such as, but not limited to, the International Mobile Subscriber Identity (IMSI), temporary identities, or Packet Data Protocol (PDP) addresses. SGSN 1442 may also store location information such as, but not limited to, the Gateway GPRS Support Node (GGSN) 1444 address for each GGSN where an active PDP exists. GGSN 1444 may implement a location register function to store subscriber data it receives from SGSN 1442 such as subscription or location information.

Serving Gateway (S-GW) 1443 is an interface which provides connectivity between E-UTRAN 1430 and Core Network 1440. Functions of S-GW 1443 include, but are not limited to, packet routing, packet forwarding, transport level packet processing, event reporting to Policy and Charging Rules Function (PCRF) 1450, and mobility anchoring for inter-network mobility. PCRF 1450 uses information gathered from S-GW 1443, as well as other sources, to make applicable policy and charging decisions related to data flows, network resources and other network administration functions. Packet Data Network Gateway (PDN-GW) 1445 may provide user-to-services connectivity functionality including, but not limited to, network-wide mobility anchoring, bearer session anchoring and control, and IP address allocation for PS domain connections.

Home Subscriber Server (HSS) 1463 is a database for user information, and stores subscription data regarding Mobile Station 1401 or User Equipment 1402 for handling calls or data sessions. Networks may contain one HSS 1463 or more if additional resources are required. Exemplary data stored by HSS 1463 include, but is not limited to, user identification, numbering and addressing information, security information, or location information. HSS 1463 may also provide call or session establishment procedures in both the PS and CS domains.

The VLR/MSC Server 1460 provides user location functionality. When Mobile Station 1401 enters a new network location, it begins a registration procedure. A MSC Server for that location transfers the location information to the VLR for the area. A VLR and MSC Server may be located in the same computing environment, as is shown by VLR/MSC Server 1460, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for Mobile Station 1401 registration or procedures for handover of Mobile Station 1401 to a different section of the Core Network 1440. GMSC Server 1461 may serve as a connection to alternate GMSC Servers for other mobile stations in larger networks.

Equipment Identity Register (EIR) 1462 is a logical element which may store the International Mobile Equipment Identities (IMEI) for Mobile Station 1401. In a typical embodiment, user equipment may be classified as either "white listed" or "black listed" depending on its status in the network. In one embodiment, if Mobile Station 1401 is stolen and put to use by an unauthorized user, it may be registered as "black listed" in EIR 1462, preventing its use on the network. Mobility Management Entity (MME) 1464 is a control node which may track Mobile Station 1401 or User Equipment 1402 if the devices are idle. Additional functionality may include the ability of MME 1464 to contact an idle Mobile Station 1401 or User Equipment 1402 if retransmission of a previous session is required.

While example embodiments of distribution of media via an ad hoc geographic routing/broadcast (geocast) protocol have been described in connection with various computing devices/processors, the underlying concepts can be applied to any computing device, processor, or system capable of facilitating distribution of media via an ad hoc geographic routing/broadcast (geocast) protocol. The various techniques described herein can be implemented in connection with hardware or software or, where appropriate, with a combination of both. Thus, the methods and apparatuses for implementing distribution of media via an ad hoc geographic routing/broadcast (geocast) protocol, or certain aspects or portions thereof, can utilize program code (i.e., instructions) embodied in tangible storage media having a tangible physical structure. Examples of tangible storage media include floppy diskettes, CD-ROMs, DVDs, hard drives, or any other tangible machine-readable storage medium (tangible computer-readable storage medium). Thus, a tangible storage medium as described herein is not a transient propagating signal. When the program code is loaded into and executed by a machine, such as a computer, the machine becomes an apparatus for implementing a mobile device configured to facilitate distribution of media via an ad hoc geographic routing/broadcast (geocast) protocol. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

The methods and apparatuses for distribution of media via an ad hoc geographic routing/broadcast (geocast) protocol also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for facilitating distribution of media via an ad hoc geographic routing/broadcast (geocast) protocol. When implemented on a general-purpose processor, the program code combines with the processor to provide a unique apparatus that operates to invoke the functionality of a mobile device configured to facilitate distribution of media via an ad hoc geographic routing/broadcast (geocast) protocol.

While distribution of media via an ad hoc geographic routing/broadcast (geocast) protocol has been described in connection with the various embodiments of the various figures, it is to be understood that other similar embodiments can be used or modifications and additions can be made to the described embodiments for a mobile device configured to facilitate distribution of media via an ad hoc geographic routing/broadcast (geocast) protocol without deviating therefrom. For example, one skilled in the art will recognize that a mobile device configured to facilitate distribution of media via an ad hoc geographic routing/broadcast (geocast) protocol as described in the present application may apply to any environment, and may be applied to any number of such devices connected via a communications network and interacting across the network. A mobile device configured to facilitate distribution of media via an ad hoc geographic routing/broadcast (geocast) protocol should not be limited to any single embodiment, but rather should be construed in breadth and scope in accordance with the appended claims.

What is claimed:

1. A method comprising:
receiving, via an ad hoc network, a message at a device, the message comprising a media segment and an indication of a geocast region of intended reception;
accepting the message if the device is within the geocast region;
determining a first distance from the device to a point in the intended reception area of the message;
determining a plurality of distances between the point and each of a plurality of sources from which the device previously had received the message;
rendering the media segment if the media segment is valid; and
retransmitting the message to another device via the ad hoc network based on the first distance being less than each of the plurality of distances.

2. The method of claim 1, wherein the message further comprises an indicator of an intended recipient device, the method further comprising:
processing the message if the device is the intended recipient device.

3. The method of claim 1, further comprising:
receiving a plurality of segments of media via a plurality of messages;
for each of the plurality of media segments, determining whether the media segment is a valid media segment or an invalid media segment; and
rendering the valid media segments.

4. The method of claim 1, wherein determining if the media segment is valid comprises:
determining where in a sequence of other media segments the media segment is positioned.

5. The method of claim 1, further comprising determining that the media segment is valid based on the media segment being later in sequence than previously received media segments.

6. The method of claim 1, wherein retransmitting the message is performed in accordance with a geocast protocol.

7. The method of claim 1, further comprising:
determining whether the message was received at least a predetermined number of times by the device,
wherein retransmitting the message is based on the message not having been received the predetermined number of times.

8. The method of claim 1, wherein
retransmitting the message is based on the message having been sent from a location closer than or equal to the predetermined minimum distance from a device location.

9. The method of claim 1, wherein
retransmitting the message is based on a nearest neighbor of an originator of the message having received the message less than a predetermined number of times.

10. A mobile device comprising:
a processor; and
memory coupled to the processor, the memory comprising executable instructions that causes the processor to effectuate operations comprising:
receiving, via an ad hoc network, a message comprising a media segment and an indication of a geocast region of intended reception of the message in accordance with a geocast protocol;
accepting the message based on the mobile device being within the region;
determining a first distance from the mobile device to a point in the intended reception area of the message;
determining a plurality of distances between the point and each of a plurality of sources from which the mobile device previously had received the message;
determining whether the media segment is valid; and
retransmitting the message to another device via the ad hoc network, based on the first distance being less than each of the plurality of distances.

11. The mobile device of claim 10, the operations further comprising:
based on the media segment being valid, rendering the media segment.

12. The mobile device of claim 10, the operations further comprising:
based on the media segment being invalid, ignoring the media segment.

13. The mobile device of claim 10, the message indicative of an intended recipient device, the operations further comprising:
not accepting the message based on the mobile device not being the intended recipient device.

14. The mobile device of claim 10, the operations further comprising:
determining a reverse message path; and
providing a response to the message via the reverse message path.

15. The mobile device of claim 10, wherein
retransmitting the message is based on the message having been sent from a location farther than a predetermined minimum distance from a location of the mobile device.

16. The mobile device of claim 10, wherein
retransmitting the message is based on a nearest neighbor of the originator of the message having not received the message at least a predetermined number of times.

17. A non-transitory computer-readable storage medium that is not a propagating signal, the computer-readable storage medium comprising instructions that cause a processor executing the instructions to perform operations comprising:
receiving by a device, via an ad hoc network, a message comprising an indication of a geocast region of intended reception of the message in accordance with a geocast protocol;
accepting the message based on the device being within the region;
determining a first distance from the device to a point in the intended reception area of the message;
determining a plurality of distances between the point and each of a plurality of sources from which the device previously had received the message;
determining, upon receipt of the message, if the message is valid; further processing the message via the device based on the message being valid;
and retransmitting the message to another device via the ad hoc network based on the first distance being less than each of the plurality of distances.

* * * * *